United States Patent
Ramesh et al.

(10) Patent No.: US 10,540,262 B2
(45) Date of Patent: Jan. 21, 2020

(54) USING EDIT AND CONTINUE TO DYNAMICALLY SET AND UNSET OPTIMIZATIONS IN SOURCE CODE WHILE DEBUGGING

(71) Applicant: Microsoft Technology Licensing, LLC, Redmond, WA (US)

(72) Inventors: Ramkumar Ramesh, Seattle, WA (US); Changqing Fu, Sammamish, WA (US); Ankit Asthana, Redmond, WA (US); Andrew B. Hall, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/295,752

(22) Filed: Oct. 17, 2016

(65) Prior Publication Data

US 2018/0107585 A1    Apr. 19, 2018

(51) Int. Cl.
*G06F 11/36* (2006.01)
*G06F 8/41* (2018.01)

(52) U.S. Cl.
CPC .......... *G06F 11/3664* (2013.01); *G06F 8/443* (2013.01)

(58) Field of Classification Search
CPC ...... G06F 11/3664; G06F 3/0482; G06F 8/30; G06F 8/70; G06F 8/443
See application file for complete search history.

(56) References Cited

U.S. PATENT DOCUMENTS

| | | | |
|---|---|---|---|
| 6,247,020 B1 * | 6/2001 | Minard | G06F 8/34 |
| 6,256,777 B1 | 7/2001 | Ackerman | |
| 6,553,565 B2 | 4/2003 | Click et al. | |
| 7,496,908 B2 * | 2/2009 | DeWitt, Jr. | G06F 8/443 717/154 |
| 7,607,123 B2 | 10/2009 | Chavan | |
| 8,656,377 B2 | 2/2014 | Xu et al. | |
| 8,997,049 B1 | 3/2015 | Melnikov et al. | |
| 9,111,033 B2 | 8/2015 | Bates | |
| 9,274,931 B2 | 3/2016 | Bowler et al. | |
| 9,342,276 B1 * | 5/2016 | Lin | G06F 8/34 |
| 9,672,133 B2 * | 6/2017 | Moench | G06F 11/362 |
| 10,162,607 B2 * | 12/2018 | Callahan | G06F 3/0482 |

(Continued)

OTHER PUBLICATIONS

MSDN,"Optimize Visual Studio 2012," 2012, pp. 1-2, downloaded from the Internet at <url>:http://web.archive.org/web/20121113202954/http://msdn.microsoft.com/en-us/library/chh3fb0k.aspx.*

(Continued)

*Primary Examiner* — S. Sough
*Assistant Examiner* — Stephen D Berman
(74) *Attorney, Agent, or Firm* — Fiala & Weaver P.L.L.C.

(57) ABSTRACT

A software development system is described that enables a user that is debugging source code to select for unoptimizing a function within the source code and to cause an edit and continue operation to be performed that produces a compiled version of the source code in which the selected function is unoptimized, while other functions remain optimized. Embodiments also enable a user to select a previously unoptimized function within the source code for re-optimizing and to cause an edit and continue operation to be performed that produces a compiled version of the source code in which the function is re-optimized. Still further embodiments enable a user to select within source code that is being developed a function for which optimization should be prevented and to cause a compiled representation of the source code to be built in which the selected function is unoptimized, while other functions are optimized.

20 Claims, 19 Drawing Sheets

(56) References Cited

U.S. PATENT DOCUMENTS

| | | | | |
|---|---|---|---|---|
| 2005/0010912 | A1* | 1/2005 | Adolphson | G06F 8/4434 717/151 |
| 2005/0155026 | A1* | 7/2005 | DeWitt, Jr. | G06F 8/443 717/158 |
| 2007/0168984 | A1* | 7/2007 | Heishi | G06F 8/443 717/124 |
| 2013/0036375 | A1* | 2/2013 | Zavatone | G06F 11/3664 715/763 |
| 2013/0275947 | A1* | 10/2013 | Bates | G06F 8/41 717/124 |
| 2014/0289707 | A1 | 9/2014 | Guan et al. | |
| 2015/0020045 | A1* | 1/2015 | Deng | G06F 11/36 717/106 |
| 2015/0378871 | A1 | 12/2015 | Asthana et al. | |
| 2017/0337041 | A1* | 11/2017 | Callahan | G06F 3/0482 |

OTHER PUBLICATIONS

MSDN, "Debugging in Visual Studio," 2013, pp. 1-3, downloaded from the Internet at <url>https://web.archive.org/web/20130507134842/http://msdn.microsoft.com/en-us/library/sc65sadd.aspx.*

"/Zo (Enhance Optimized Debugging)", Published on: Dec. 2, 2014 Available at: https://msdn.microsoft.com/en-us/library/dn785163.aspx Chen, et al., "A compiler option that helps debug optimized code", Available at: Jul. 10, 2012 Available at: http://www.ibm.com/developerworks/rational/library/debug-optimized-code-compiler-option/debug-optimized-code-compiler-option-pdf.pdf.

"How to: Debug Optimized Code", Retrieved on: Jul. 4, 2016 Available at: https://msdn.microsoft.com/en-us/library/606cbtzs.aspx.

"/Z7, /Zi, /Zl (Debug Information Format)", Published on: Sep. 19, 2008 Available at: https://msdn.microsoft.com/en-us/library/958x11bc.aspx.

Hozle, et al., "Debugging Optimized Code with Dynamic Deoptimization", In Proceedings of the ACM SIGPLAN conference on Programming language design and implementation, Jul. 1, 1992, pp. 32-43.

Kumar, et al., "Transparent Debugging of Dynamically Optimized Code", In Proceedings of the 7th annual IEEE/ACM International Symposium on Code Generation and Optimization, Mar. 22, 2009, 12 pages.

* cited by examiner

Figure 4:
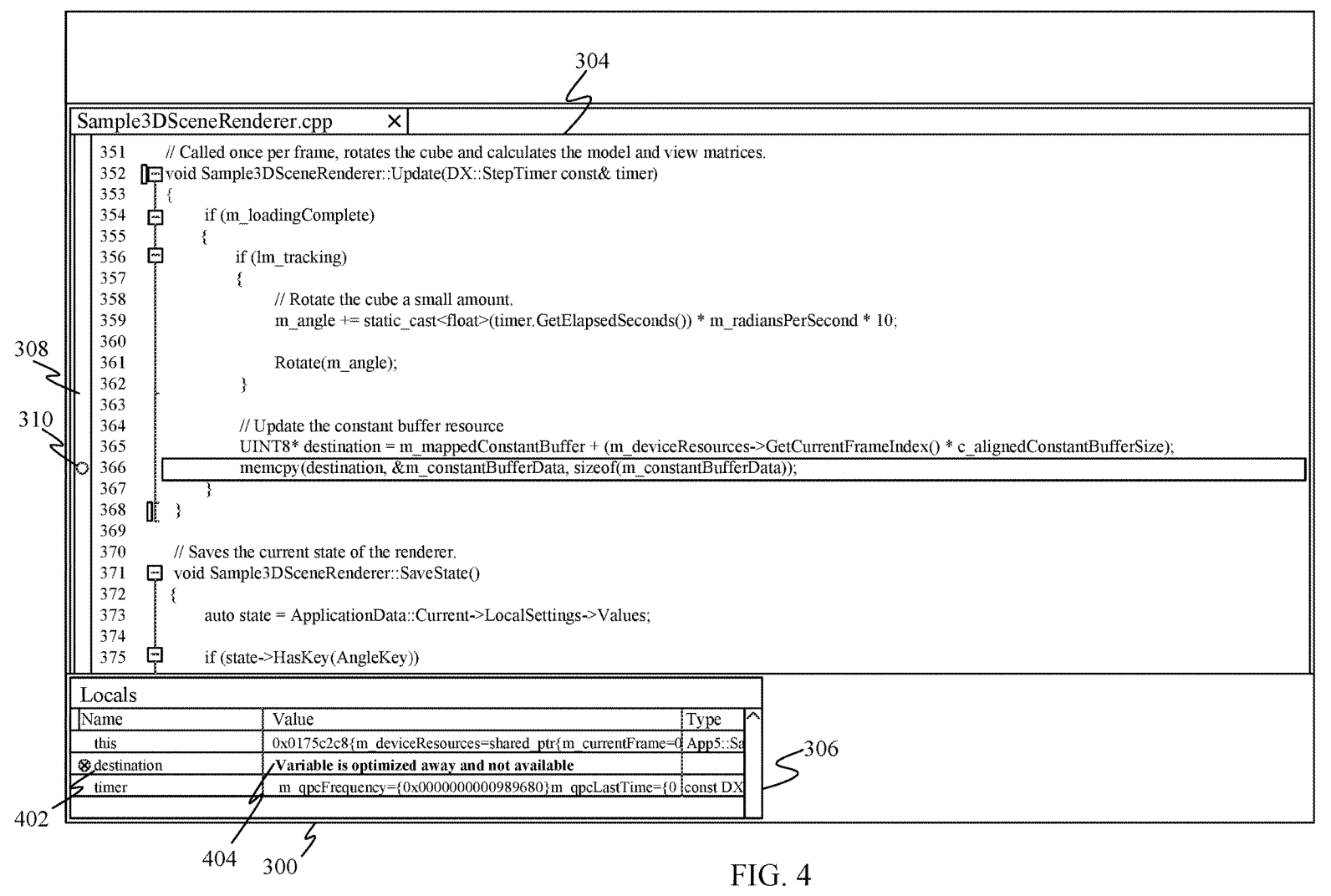

```
Sample3DSceneRenderer.cpp    X
351    // Called once per frame, rotates the cube and calculates the model and view matrices.
352    void Sample3DSceneRenderer::Update(DX::StepTimer const& timer)
353    {
354        if (m_loadingComplete)
355        {
356            if (!m_tracking)
357            {
358                // Rotate the cube a small amount.
359                m_angle += static_cast<float>(timer.GetElapsedSeconds()) * m_radiansPerSecond * 10;
360
361                Rotate(m_angle);
362            }
363
364            // Update the constant buffer resource
365            UINT8* destination = m_mappedConstantBuffer + (m_deviceResources->GetCurrentFrameIndex() * c_alignedConstantBufferSize);
366            memcpy(destination, &m_constantBufferData, sizeof(m_constantBufferData));
367        }
368
369        // Saves the current state of the renderer.
370        void Sample3DSceneRenderer::SaveState()
371        {
372            auto state = ApplicationData::Current->LocalSettings->Values;
373
374            if (state->HasKey(AngleKey))
375            {
```

Locals

| Name | Value | Type |
|---|---|---|
| this | 0x0175c2c8{m_deviceResources=shared_ptr{m_currentFrame=0 | App5::Sa |
| ⊗ destination | Variable is optimized away and not available | |
| timer | m_qpcFrequency={0x00000000000989680} m_qpcLastTime={0 | const DX |

```
Sample3DSceneRenderer.cpp  [X]
351   // Called once per frame, rotates the cube and calculates the model and
352   /* Function 'Sample3DSceneRenderer::Update' unoptimized by Edit and Continue.
353   This change will be reverted automatically on stopping debugging.*/
354   #pragma optimize("", off)
355   void Sample3DSceneRenderer::Update(DX::StepTimer const& timer)
356   {
357       if (m_loadingComplete)
358       {
359           if (!m_tracking)
360           {
361               // Rotate the cube a small amount.
362               m_angle += static_cast<float>(timer.GetElapsedSeconds()) * m_radiansPerSecond * 10;
363
364               Rotate(m_angle);
365           }
366
367           // Update the constant buffer resource
368           UINT8* destination = m_mappedConstantBuffer + (m_deviceResources->GetCurrentFrameIndex() * c_alignedConstantBufferSize);
369           memcpy(destination, &m_constantBufferData, sizeof(m_constantBufferData));
370       }
371   }
372   #pragma optimize("", on)
373
374   // Saves the current state of the renderer.
375   void Sample3DSceneRenderer::SaveState()
```

Locals

| Name | Value | Type |
|---|---|---|
| this | 0x0175c2c8{m_deviceResources=shared_ptr{m_currentFrame=( | App5::Sa |
| destination | 0x05d60200 "˝\r" | unsigned |
| timer | {m_qpcFrequency={0x0000000000989680}m_qpcLastTime={0 | const DX |

Sample3DSceneRenderer.cpp  X

```
351    // Called once per frame, rotates the cube and calculates the model and
352    /* Function 'Sample3DSceneRenderer::Update' unoptimized by Edit and Continue.
353    This change will be reverted automatically on stopping debugging.*/
354    #pragma optimize("", off)
355    void Sample3DSceneRenderer::Update(DX::StepTimer const& timer)
356    {
357        if (m_loadingComplete)
358        {
359            if (!m_tracking)
360            {
361                // Rotate the cube a small amount.
362                m_angle += static_cast<float>(timer.GetElapsedSeconds()) * m_radiansPerSecond * 10;
363
364                Rotate(m_angle);
365            }
366
367            // Update the constant buffer resource
368            UINT8* destination = m_mappedConstantBuffer + (m_deviceResources->GetCurrentFrameIndex() * c_alig
369            memcpy(destination, &m_constantBufferData, sizeof(m_constantBufferData));
370        }
371    }
372    #pragma optimize("", on)
373
374    // Saves the current state of the renderer.
375    void Sample3DSceneRenderer::SaveState()
```

304

Optimized Debugging Assistant ▼ ↧ ×

Un-optimized methods

◢ Sample3DSceneRenderer.cpp
   Sample3DSceneRenderer::Update

802

Locals

| Name | Value | Type |
|---|---|---|
| this | 0x0175c2c8{m_deviceResources=shared_ptr{m_currentFrame={ | App5::Sa |
| destination | 0x05d60200 "..\r" | ▼ unsigned |
| timer | m_qpcFrequency={0x000000000989680}m_qpcLastTime={0{const DX |

306

300

502

Generate an incremental program database that at least indicates dependencies between functions of the fully optimized compiled representation of the source code

Generate a dependence graph for the source code based on the incremental program database

1604

Traverse the dependence graph from any functions and any variables included in the marked portion (or determined as changed) to determine a set of affected functions

1606

Include any functions in the marked portion (or determined as changed) and any functions in the determined set of affected functions in a set of functions to be recompiled with optimizations disabled

FIG. 16

USING EDIT AND CONTINUE TO DYNAMICALLY SET AND UNSET OPTIMIZATIONS IN SOURCE CODE WHILE DEBUGGING

BACKGROUND

Various types of software development applications exist that software developers may use to develop software. An integrated development environment (IDE) is a type of software development application that contains several development tools in one package. An IDE may include tools such as a source code editor, a build automation tool, and a debugger. Examples of IDEs include Eclipse™ developed by Eclipse Foundation of Ottawa, Canada, ActiveState Komodo™ developed by ActiveState of Vancouver, Canada, IntelliJ IDEA developed by JetBrains of the Czech Republic, Oracle JDeveloper™ developed by Oracle Corporation of Redwood City, Calif., NetBeans developed by Oracle Corporation, Codenvy™ developed by Codenvy of San Francisco, Calif., Xcode® developed by Apple Corporation of Cupertino, Calif., and Microsoft® Visual Studio®, developed by Microsoft Corporation of Redmond, Wash.

Code optimization refers to a method of code modification that improves code quality and/or efficiency. A program may be optimized so that it becomes a smaller size, consumes less memory, executes more rapidly, or performs fewer input/output operations. Code optimization may be performed, for example, by a specialized software tool or a built-in unit of a compiler (a so-called "optimizing compiler"). Code optimization is used in the development of many types of applications, including the development of video games, where developers may generate optimized builds in daily use (primarily for performance reasons). An optimized build results in machine code that is semantically equivalent to machine code generated without optimizations, but is configured in a way that fewer resources are used during execution of the optimized machine code (e.g., less memory, fewer procedure calls, etc.).

As noted above, many developers use optimized build configurations for their daily developer build scenarios. This is a very common practice for game developers, who need their games to run at a particular speed to add visual effects, etc. Due to the introduction of certain optimizations (e.g., inlining, register allocation, common subexpression elimination, etc.), it is common for a developer that is debugging optimized code to observe a hopping program counter (the program counter jumps around in a manner that is not sequential), cross-jumping, the well-known roving variable phenomenon (e.g., a variable might be dead and its register is reused, assignment to a variable has been moved etc.), as well as other undesired phenomenon. Thus, such optimizations can make debugging the optimized code a difficult and frustrating experience for the average developer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein that enable a user that is debugging source code to easily select for unoptimizing a function from within the source code and to cause an edit and continue operation to be performed that produces a compiled version of the source code in which the selected function is unoptimized, while other functions remain optimized. This compiled version of the source code can then be used for continued debugging of the source code. Embodiments described herein also enable a user that is debugging source code to easily select for re-optimizing a previously unoptimized function from within the source code and to cause an edit and continue operation to be performed that produces a compiled version of the source code in which the function is re-optimized. This compiled version of the source code can then be used for continued debugging of the source code. Still further embodiments described herein enable a user to easily select from within source code that is being developed a function for which optimization should be prevented and to cause a compiled representation of the source code to be built in which the selected function is unoptimized, while other functions are optimized.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 3-8 depict different configurations of an exemplary graphical user interface (GUI) of a software development system that can be used to dynamically set and unset optimizations for selected source code functions while debugging optimized code, in accordance with an embodiment.

Figure 9:
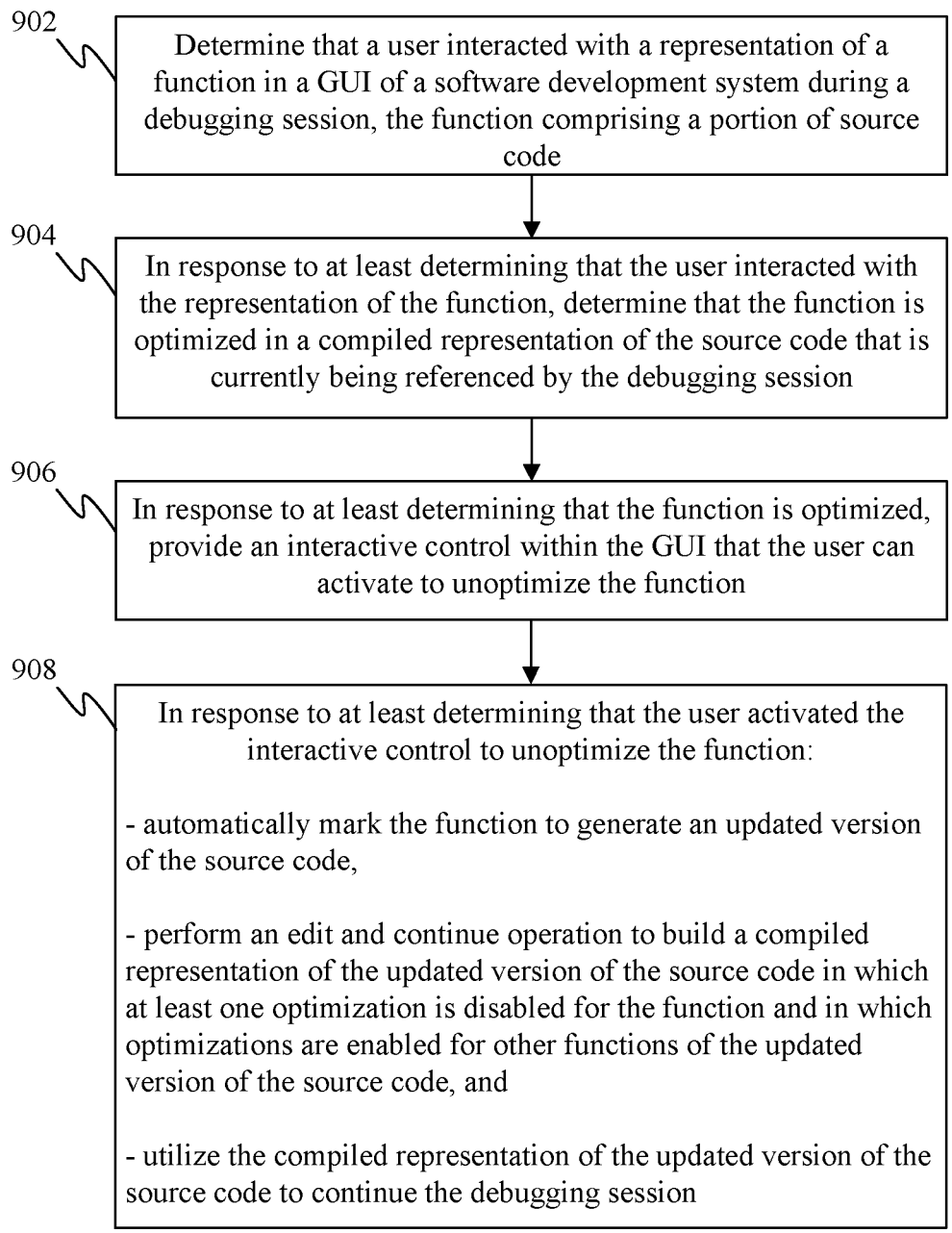

FIG. 9 depicts a flowchart of a method in accordance with an embodiment that enables a user that is debugging source code to select for unoptimizing a function within the source code and to cause an edit and continue operation to be performed that produces a compiled version of the source code for continued debugging in which the selected function is unoptimized, while other functions remain optimized.

Figure 10:
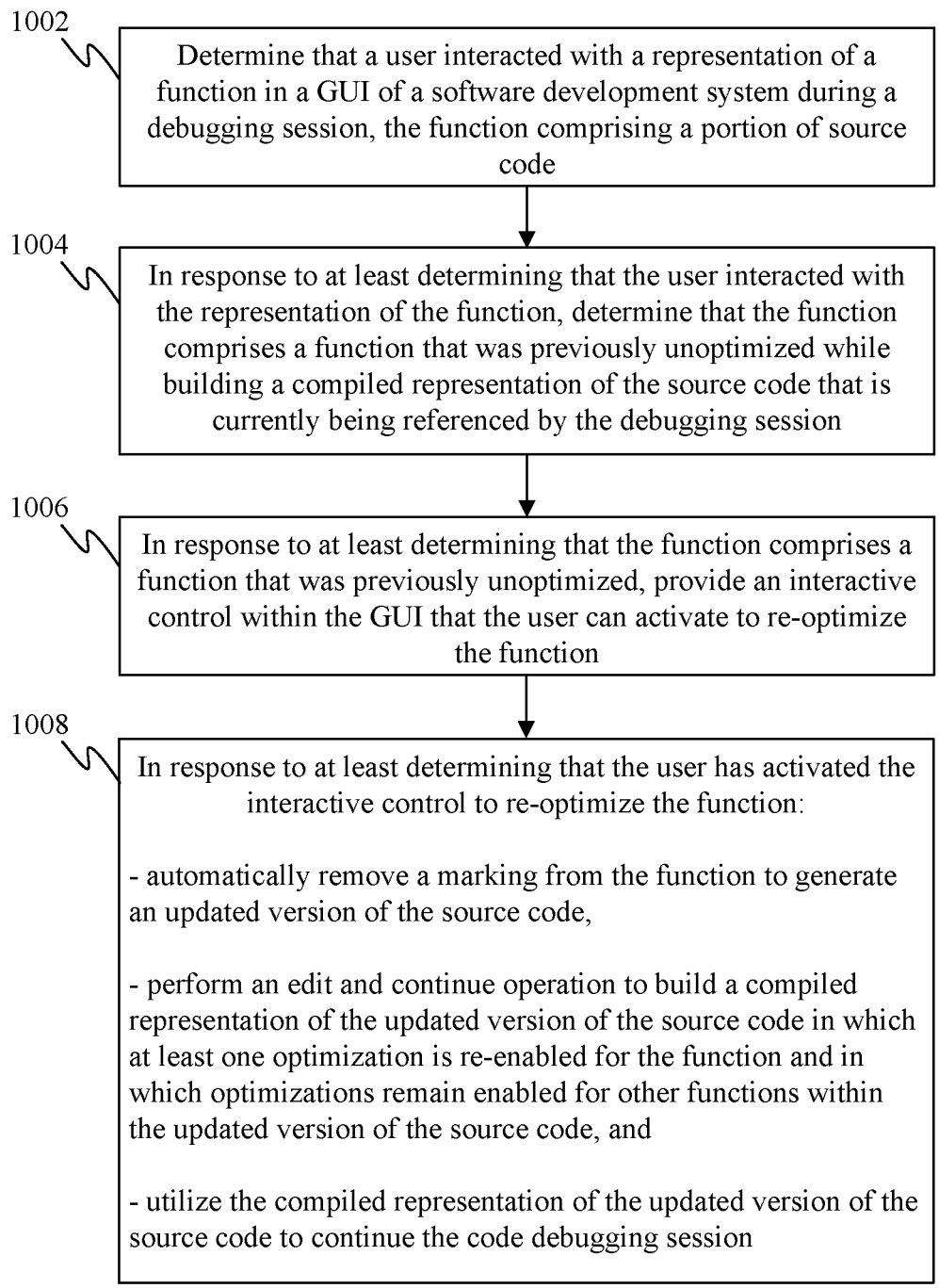

FIG. 10 depicts a flowchart of a method in accordance with an embodiment ath enables a user that is debugging source code to select for re-optimizing a previously unoptimized function from within the source code and to cause an edit and continue operation to be performed that produces a compiled version of the source code for continued debugging in which the selected function is re-optimized.

Figure 11:
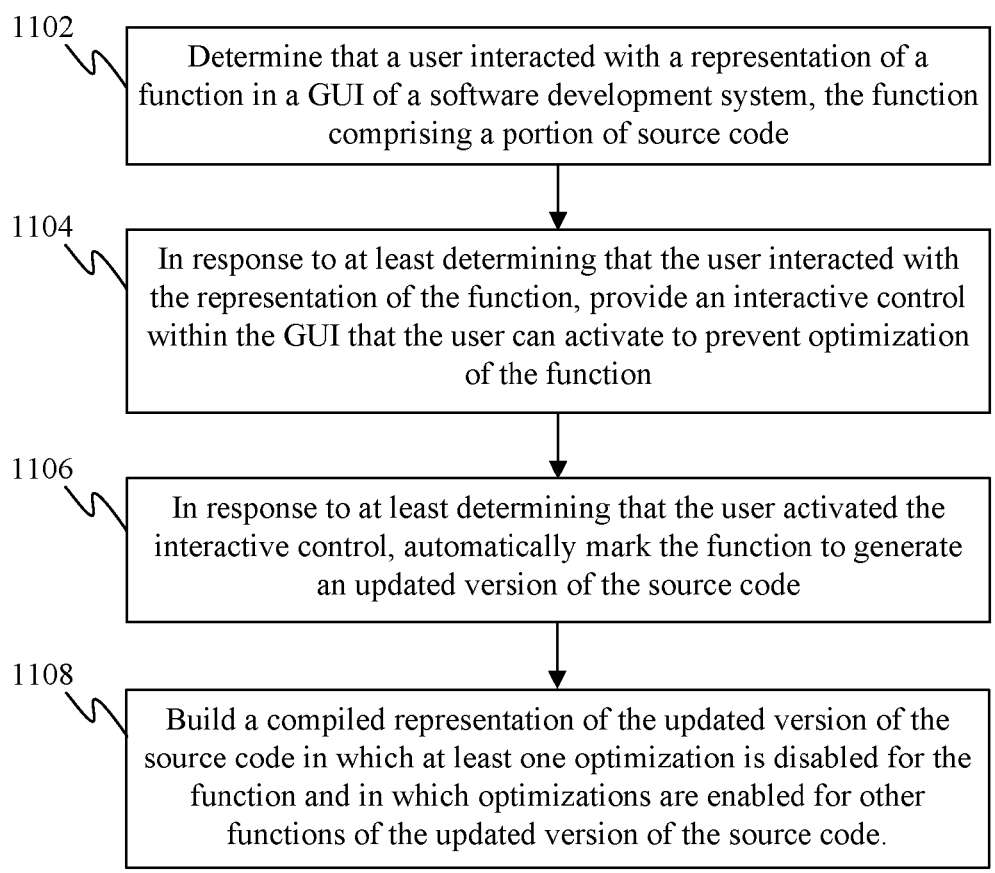

FIG. 11 depicts a flowchart of a method in accordance with an embodiment that enables a user that is developing source code to select a function from within the source code for which optimization should be prevented and to cause a compiled representation of the source code to be built in which the selected function is unoptimized, while other functions are optimized.

Figure 12:
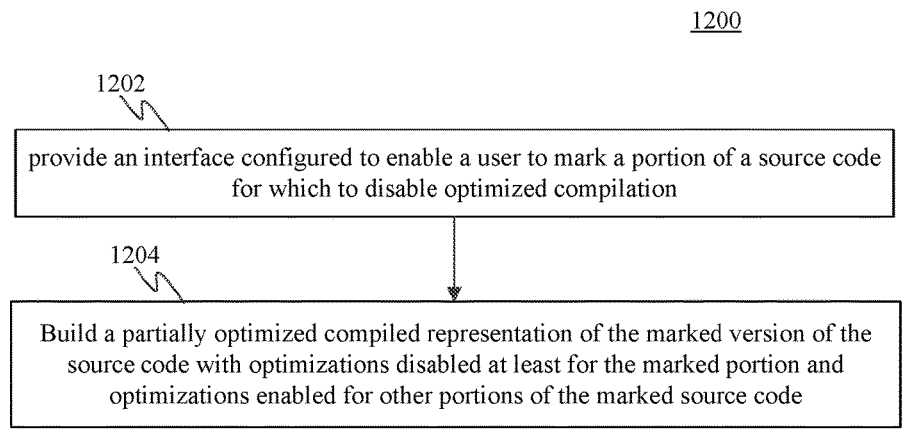

FIG. 12 shows a flowchart providing a process to disable optimized compilation for a portion of source code, and to compile the source code, according to an example embodiment.

Figure 13:
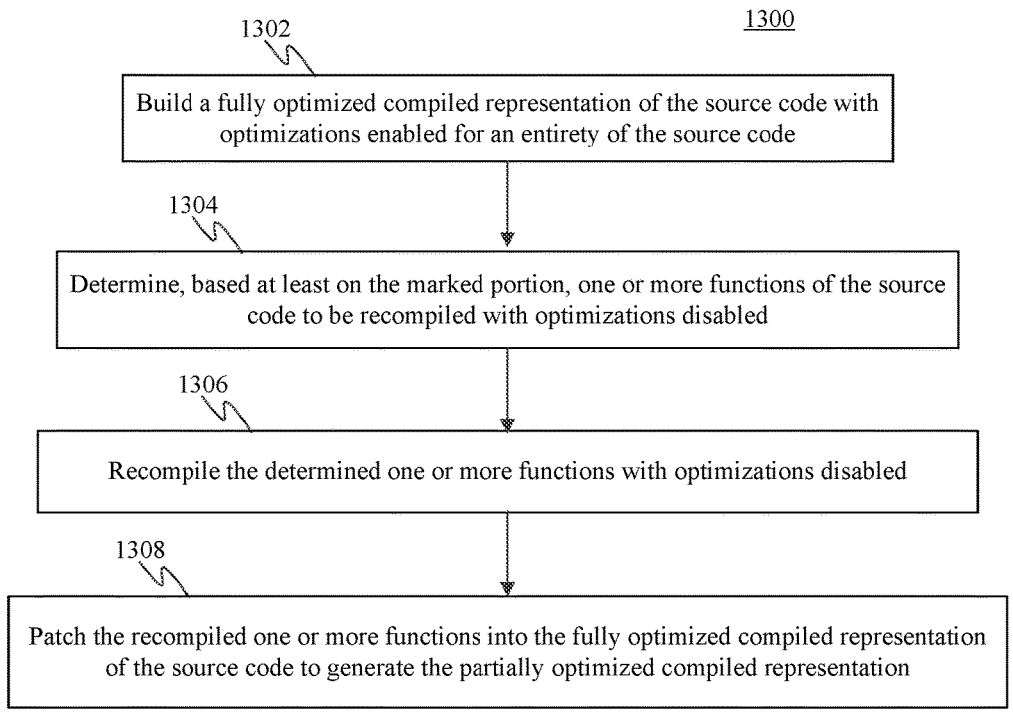

FIG. 13 shows a flowchart providing a process for compiling source code in which optimized compilation of some functions of the source code is disabled, according to an example embodiment.

Figure 14:
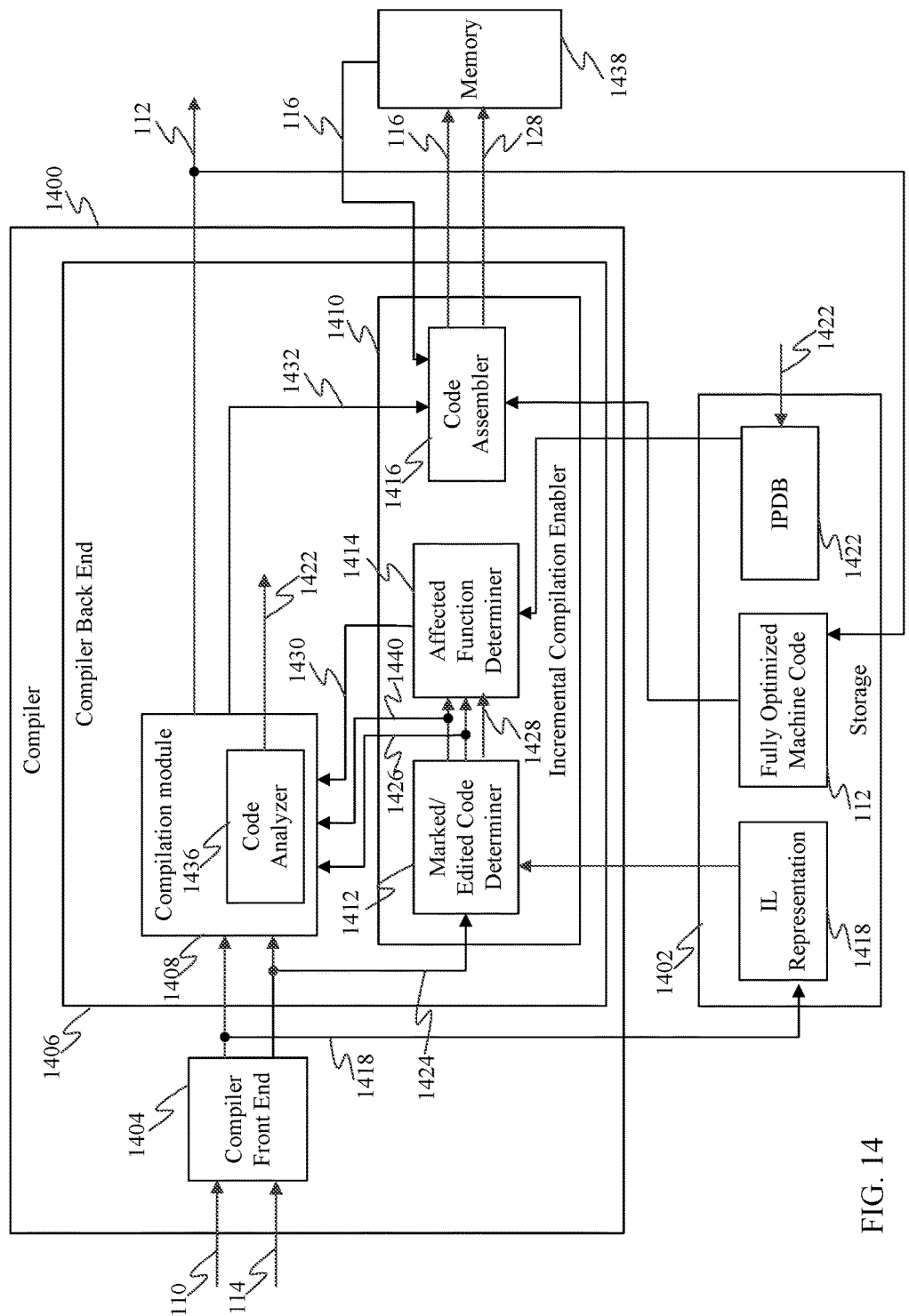

FIG. 14 shows a block diagram of a compiler configured to perform full and incremental compilation of source code, according to an example embodiment.

FIG. 15 shows a process for generating an incremental program database that stores information about source code, according to an example embodiment.

FIG. 16 shows a flowchart providing a process for determining functions to be compiled with optimizations disabled using a dependence graph, according to an example embodiment.

Figure 17:
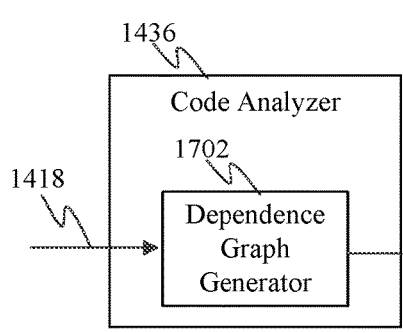

FIG. 17 shows a block diagram of a code analyzer configured to generate a dependence graph, according to an example embodiment.

Figure 18:
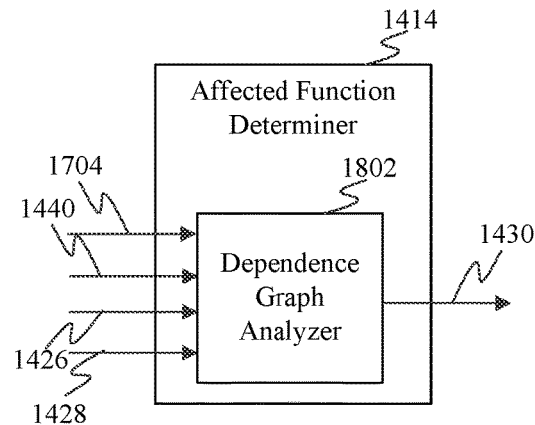

FIG. 18 shows a block diagram of an affected function determiner configured to analyze a dependence graph, according to an example embodiment.

Figure 19:
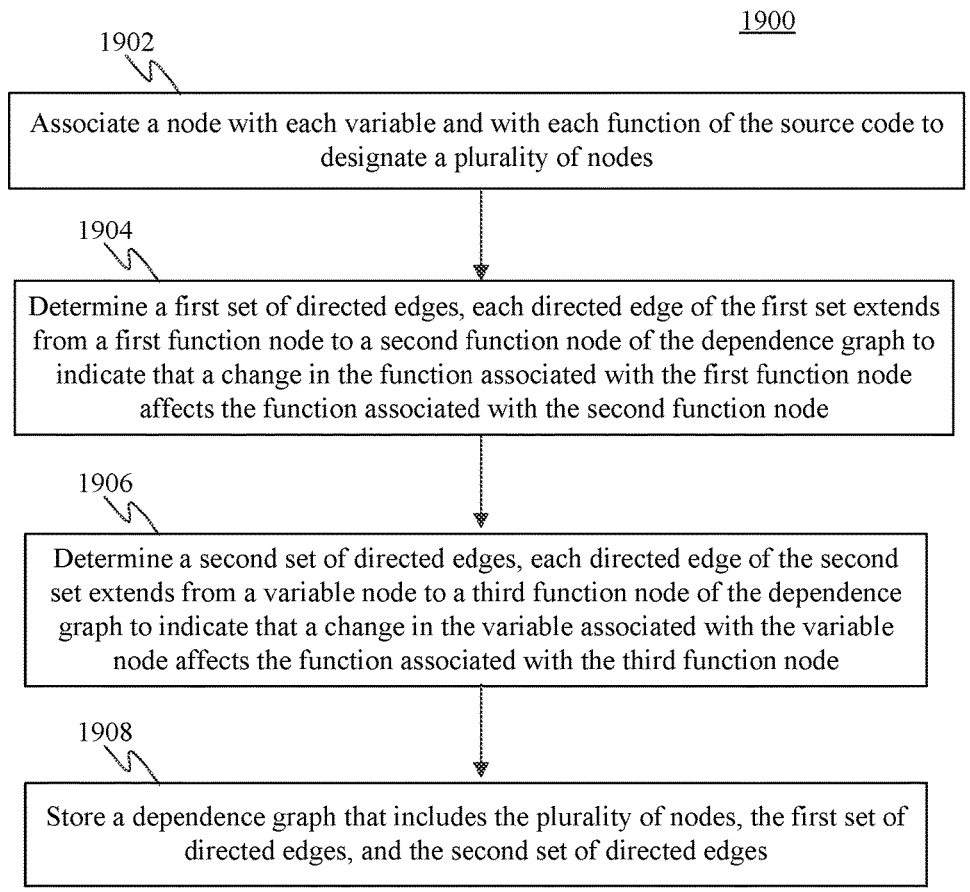

FIG. 19 shows a flowchart providing a process for generating a dependence graph, according to an example embodiment.

Figure 20:
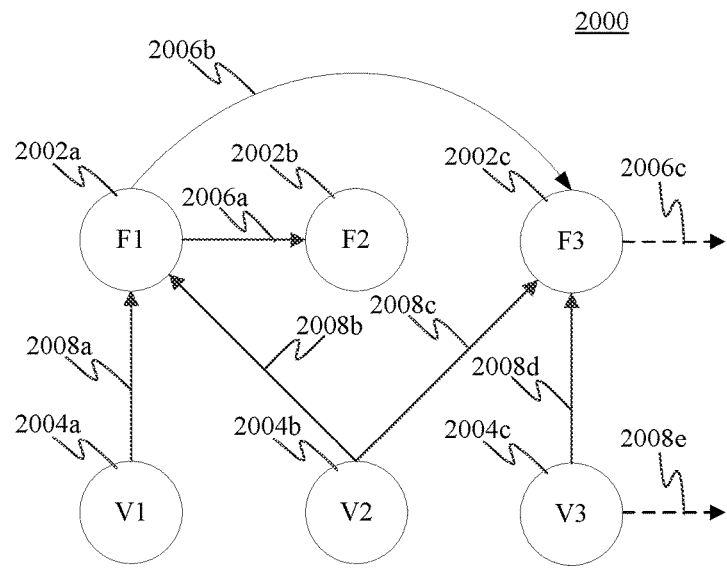

FIG. 20 shows a graphical representation of a portion of an exemplary dependence graph, according to an embodiment.

Figure 21:
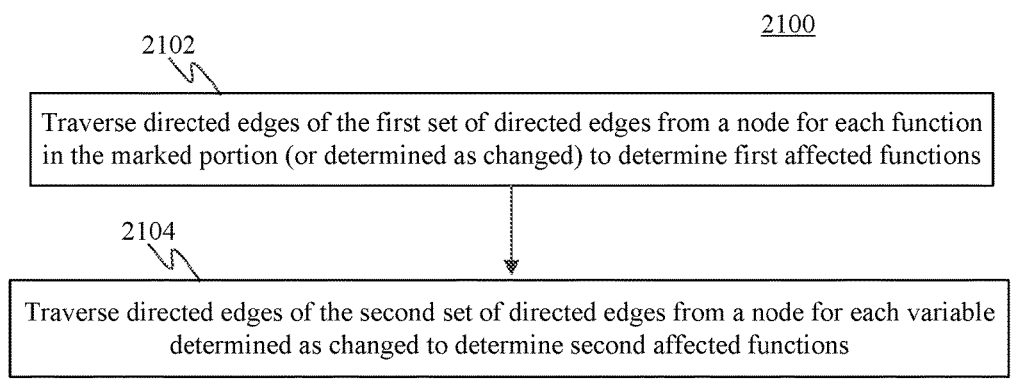

FIG. 21 shows a flowchart providing a process for analyzing a dependence graph, according to an example embodiment.

Figure 22:
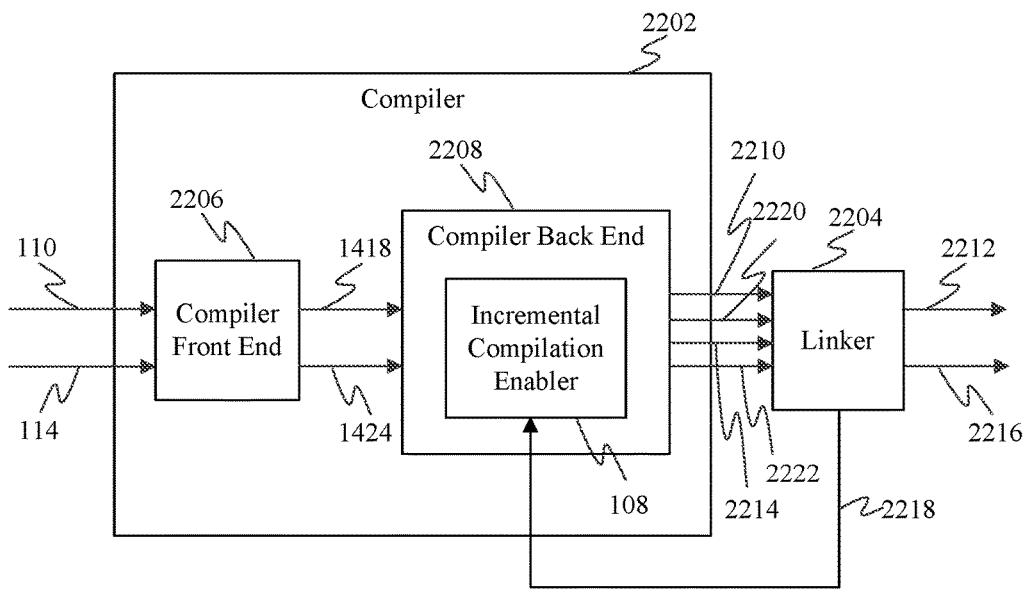

FIG. 22 shows a block diagram of a build system for incremental compilation that includes a complier and a linker, according to an example embodiment.

Figure 23:
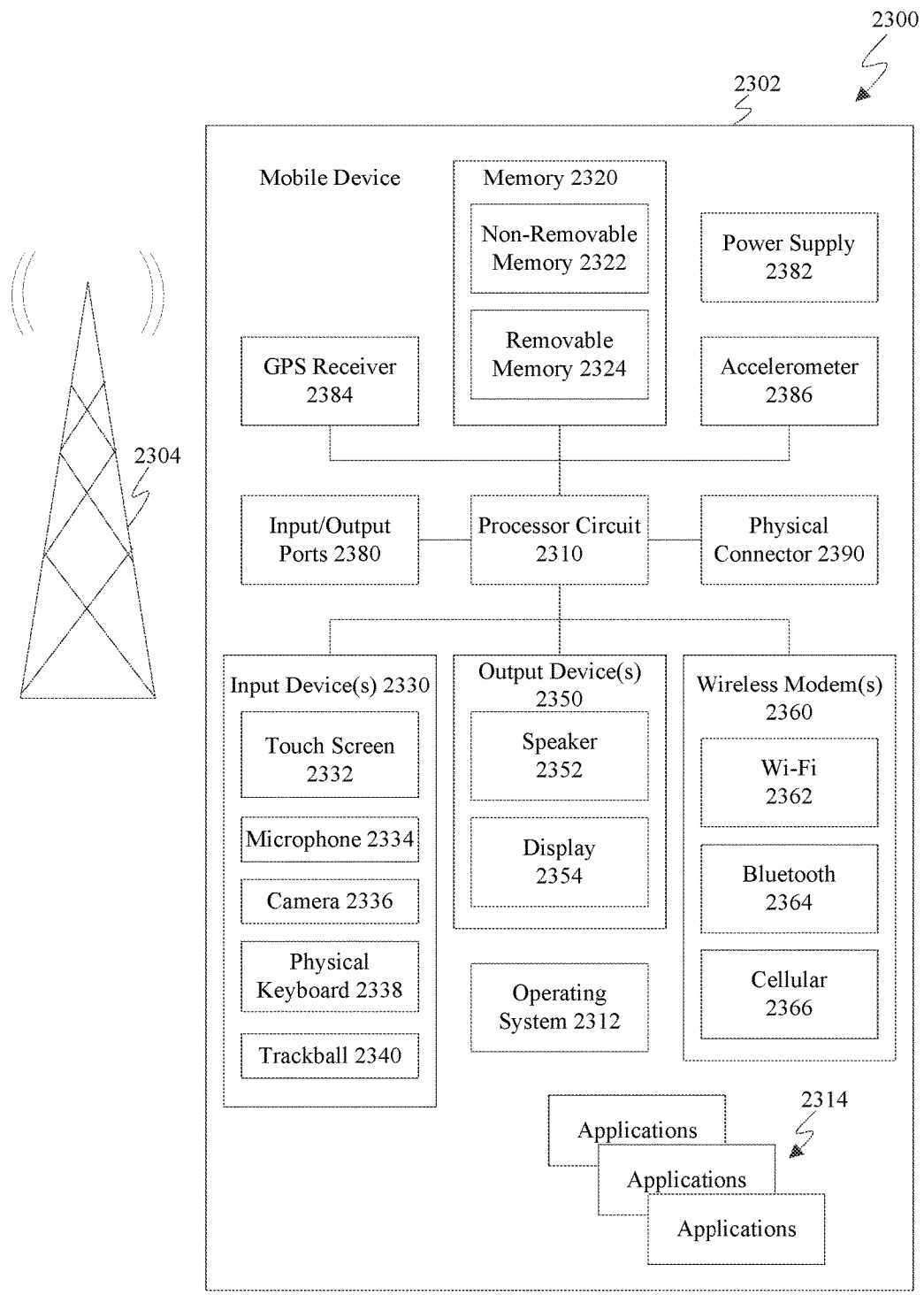

FIG. 23 shows a block diagram of an exemplary user device in which embodiments may be implemented.

Figure 24:
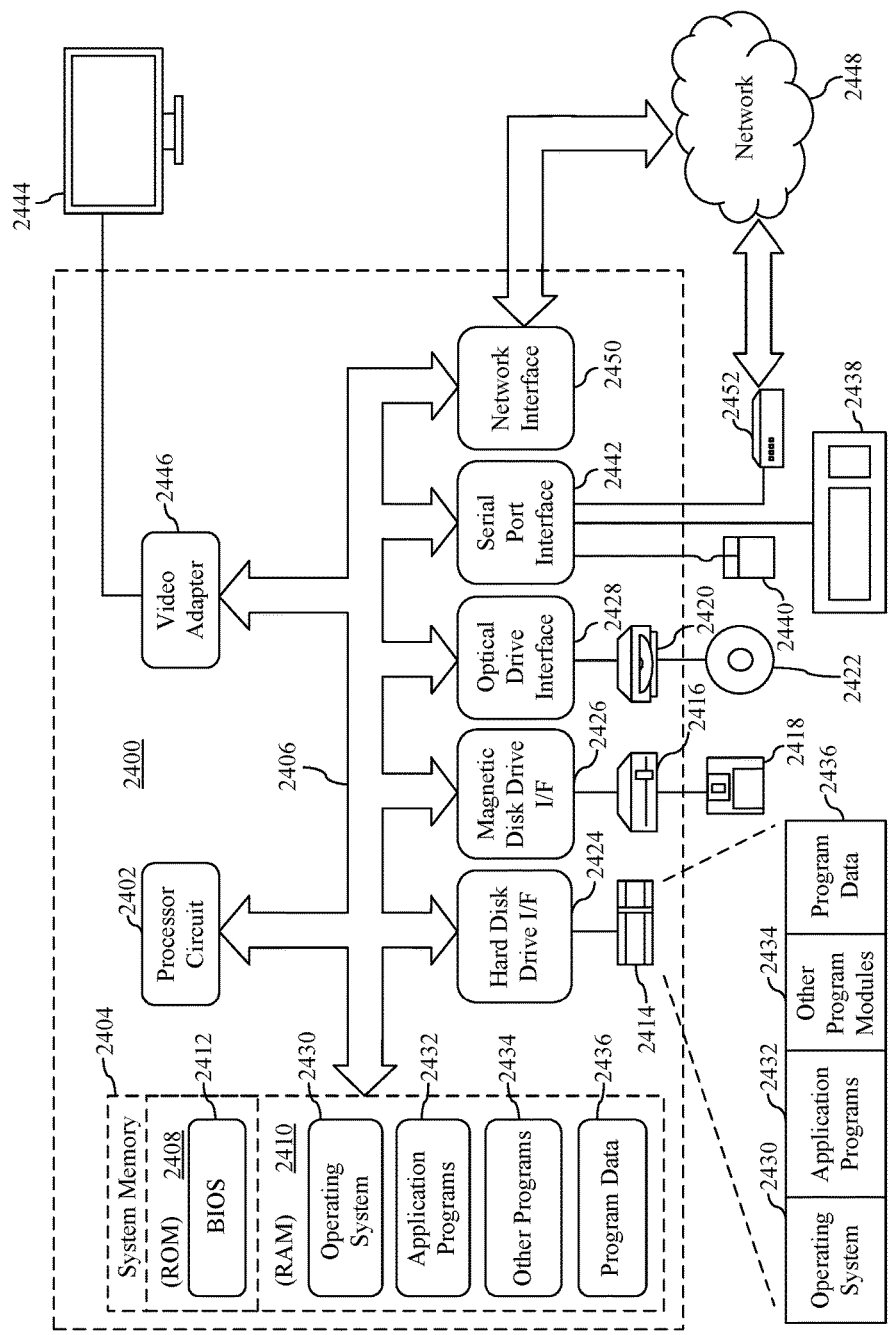

FIG. 24 shows a block diagram of an example computing device that may be used to implement embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

As discussed in the Background Section above, many developers use optimized build configurations for their daily developer build scenarios. This is a very common practice for game developers, who need their games to run at a particular speed to add visual effects, etc.

Because a compiler generates debugging tables for a compilation unit before it performs optimizations, the optimizing transformations may invalidate some of the debugging data, making conventional forms of debugging difficult. For instance, if during an optimization, a loop is strength-reduced, in the resulting optimized machine code, the loop control variable may be completely eliminated and thus cannot be displayed in the debugger tool. The "hopping Program Counter" problem (repeated step or next commands show the program counter bouncing back and forth in the code) may occur due to various optimizations, such as common subexpression elimination (using a single instance of code for a quantity that the source computes several times), invariant code motion (moving an expression that does not change within a loop, to the beginning of the loop), instruction scheduling, etc. The "cross-jumping" problem is where two identical pieces of code are merged, and the program counter suddenly jumps to a statement that is not supposed to be executed, simply because it (and the code following) translates to the same thing as the code that was supposed to be executed. The "roving variable" problem (an unexpected value in a variable) may have various causes, including a dead variable (and its register is reused), the assignment of a value to a variable may have been moved, or a variable may be eliminated entirely by value propagation or other means.

Embodiments described herein can help reduce or eliminate these and other difficulties associated with debugging optimized code by enabling a developer to easily select one or more functions for unoptimizing from within the source code being debugged and to cause an edit and continue operation to be performed that produces a compiled version of the source code in which the selected function(s) are unoptimized, while other functions remain optimized. This compiled version of the source code can then be used for continued debugging, during which the aforementioned problems associated with debugging optimized code may be reduced or eliminated entirely for the selected function(s).

Embodiments described herein also enable a user to easily select for re-optimizing a previously unoptimized function from within the source code, and to cause an edit and continue operation to be performed that produces a compiled version of the source code in which the function is re-optimized. This compiled version of the source code can then be used for continued debugging. Still further embodiments described herein enable a user to easily select a function for which optimization should be prevented from within source code that is being developed, and to cause a compiled representation of the source code to be built in which the selected function is unoptimized, while other functions are optimized.

Section II below will describe embodiments that enable a user to easily set and unset optimizations for selected source code functions in either a debugging or development context. Section III will provide further technical details concerning how a compiled representation of the source code may be built with certain functions selectively unoptimized and others selectively optimized. Section IV will describe some example mobile and stationary device embodiments. Section V will describe some additional exemplary embodiments. Section VI will provide some concluding remarks.

Figure 1:
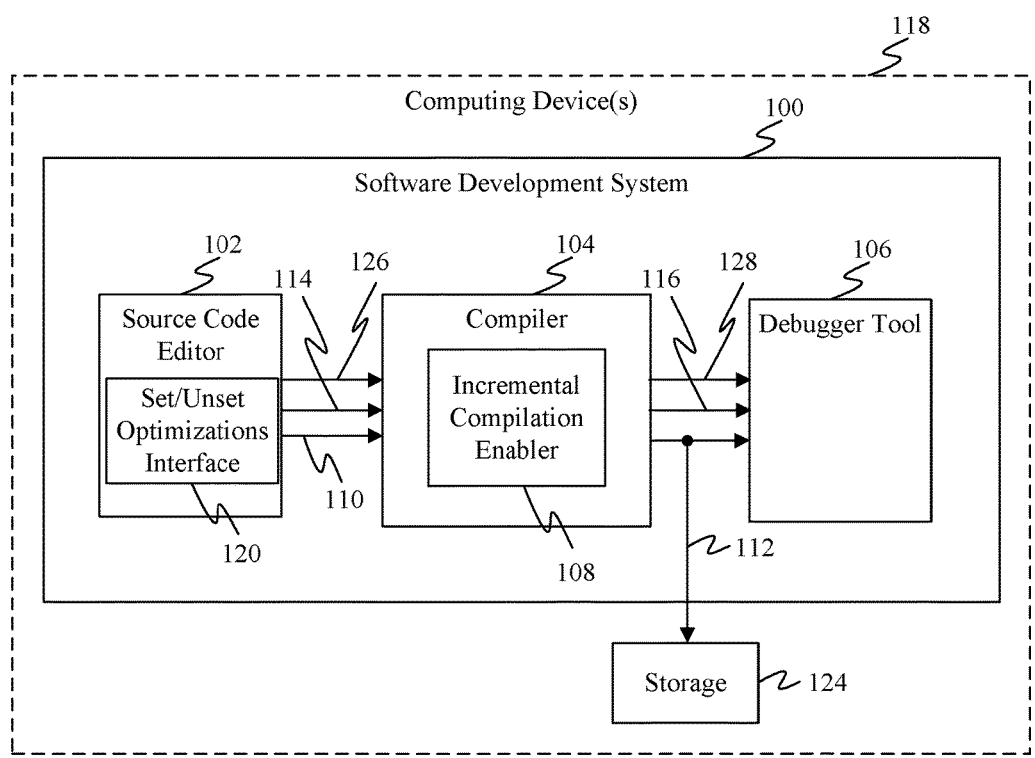
FIG. 1 is a block diagram of an example software development system that enables a developer to easily set and unset optimizations for selected source code functions in either a debugging or development context, in accordance with an embodiment.

II. Example Embodiments for Setting and Unsetting Optimizations for Selected Source Code Functions FIG. 1 is a block diagram of an example software development system or application 100 that enables a person who is developing/creating source code, referred to as a "developer" (also referred to as "user" herein), to easily set and unset optimizations for selected source code functions in either a debugging or development context, in accordance with an embodiment. As shown in FIG. 1, software development system 100 includes a source code editor 102, a compiler 104, and a debugger tool 106. Furthermore, compiler 104 includes an incremental compilation enabler 108. The features of system 100 are described as follows.

As shown in FIG. 1, software development system 100 may be implemented in one or more computing devices 118. For instance, source code editor 102, compiler 104, and debugger tool 106 may be implemented by the same computing device, or one or more of source code editor 102, compiler 104, and debugger tool 106 may be implemented by one or more computing devices that are separate from those used to implement others of source code editor 102, compiler 104, and debugger tool 106.

Computing device(s) 118 may be any type of stationary or mobile computing device(s), including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer).

A developer may interact with source code editor 102 to enter and modify program code when generating source code for an application. For instance, the developer may add, modify, or delete program code text using source code editor 102 such as by typing, by voice input, by selecting suggested code blocks, etc. When complete, or at other intervals, the user may be enabled to save the program code by interacting with a "save" button or other user interface element. Source code editor 102 may be a browser based editor, a code editor integrated in a desktop or mobile application, or any other type of code editor.

For instance, as shown in FIG. 1, a developer may interact with source code editor 102 to generate source code 110. Source code 110 is a collection of computer instructions (possibly with comments) written using a human-readable computer programming language. Examples of suitable human-readable computer programming languages include C, C++, Java, etc. Source code 110 may be received in one or more files or other form. For instance, source code 110 may be received as one or more ".c" files (when the C programming language is used), as one or more ".cpp" files (when the C++ programming language is used), etc.

Compiler 104 may be invoked in any manner, such as by a command line, a graphical user interface (GUI), etc. A "-full" switch, or other switch, may be used when compiler 104 is invoked to perform a full compile. Compiler 104 is configured to receive and compile source code 110 to generate fully optimized machine code 112. In particular, compiler 104 is configured to transform source code 110 into fully optimized machine code 112 in the form of another computer language, typically having a binary form, referred to as machine code or object code. In some cases, compiler 104 may include multiple stages, and may first convert source code 110 into an intermediate form (e.g., an intermediate language), which is subsequently converted into fully optimized machine code 112.

Compiler 104 performs one or more types of optimizations on source code 110 when generating fully optimized machine code 112. An optimized build results in machine code that is semantically equivalent to machine code generated without optimizations, but is configured in a way that fewer resources are used during execution of the optimized machine code (e.g., less memory, fewer procedure calls, etc.). Examples of optimizations that may be performed include loop optimizations, data-flow optimizations, SSA-based optimizations, code-generator optimizations, functional language optimizations, interprocedural optimizations, and/or further types of optimizations that would be known to persons skilled in the relevant art(s). Many specific types of optimizations exist. For example, "inlining" may be performed, where a callee function called by a caller function is copied into the body of the caller function. In another example of a specific optimization, "common subexpression elimination" may be performed, where a single instance of code is used for a quantity that is computed multiple times in source code.

Fully optimized machine code 112 may be included in a file (e.g., an object or ".obj" file), or may be created/stored in another form, to form an executable program or application. As shown in FIG. 1, fully optimized machine code 112 may be stored in storage 124 of computing device(s) 118.

Debugger tool 106 may receive fully optimized machine code 112. Debugger tool 106 is configured to run a debugging (or "debug", "debugger") session on the application represented by fully optimized machine code 112. In a debugging session, a developer may be enabled to step through the execution of code of fully optimized machine code 112, while viewing the values of variables, arrays, attributes, and/or outputs (e.g., contents of registers, a GUI, etc.) generated by the execution of fully optimized machine code 112. In this manner, a developer may be able to test or troubleshoot ("debug") source code 110, making edits to source code 110 using source code editor 102 based on the results of the debugging session. The modified version of source code 110 may be compiled by compiler 104 and received by debugger tool 106 for further debugging. Debugger tool 106 may include or invoke one or more processors (e.g., a central processing unit (CPU)), physical and/or virtual, to execute fully optimized machine code 112.

As shown in FIG. 1, source code editor 102 may include a set/unset optimizations interface 120. Set/unset optimizations interface 120 is an interface provided by source code editor 102 to allow a developer to easily select individual functions within source code 110 for which optimizations should be enabled or disabled. In particular, set/unset optimizations interface 120 may be configured to enable a user to select a function within source code 110 for which to disable optimized compilation. Set/unset optimizations interface 120 may also be configured to enable a user to select a function within source code 110 for which optimized compilation was previously disabled and for which optimized compilation is to be re-enabled. Accordingly, set/unset optimizations interface 120 is configured to enable the user to disable or re-enable optimized compilation of functions on a function-by-function basis in source code 110.

Set/unset optimizations interface 120 may be any type of user interface that includes any number of user interface elements, including a GUI, a touch interface, a voice control interface, a haptic interface, a gesture interface, etc. In an embodiment, a developer may interact with set/unset optimizations interface 120 to select a function for which optimized compilation is to be disabled, which results in the function being marked. For instance, set/unset optimizations interface 120 may display a user interface element such as a checkbox, a toggle switch, a button, a pull down menu, or another user interface element for a function of source code displayed by code editor 102. The developer may interact with the user interface element to select the function for compilation without optimizations, which results in the function being marked.

As such, source code editor 102 may generate marked source code 114, which is a marked version of source code 110 with indications of one or more functions for which to disable optimized compilation. For instance, comments, tags, special characters, attributes, one or more lines of code, and/or other markings may be automatically inserted and/or modified in marked source code 114 to indicate the one or more marked functions. Each marked function may be individually marked in marked source code 114, a table indicating all marked functions may be maintained in a header or other location of marked source code 114, and/or marked functions may be indicated in other ways in marked source code 114.

Compiler 104 is configured to receive and compile marked source code 114 to generate partially optimized machine code 116. Partially optimized machine code 116 a partially optimized compiled representation of marked source code 114, with a non-optimized portion corresponding to the marked function(s) of marked source code 114, and a fully optimized remaining portion. Compiler 104 may compile marked source code 114 in this manner using any suitable compilation technique, including incremental compilation as described herein.

As shown in FIG. 1, compiler 104 includes incremental compilation enabler 108. Incremental compilation enabler 108 enables compiler 104 to perform incremental compilation, which is a compilation of portions of source code (e.g., marked portions, portions affected by modifications thereto, etc.) rather than a full compilation of the source code, which can take significantly longer.

Incremental compilation enabler 108 enables compiler 104 to compile marked source code 114 into machine code faster than source code 110 was originally compiled to generate machine code 112. This is because just the marked functions of source code 114, and any other functions that are affected by the marked functions, are recompiled and included in partially optimized machine code 116. The functions of marked source code 114 that are unrelated to the marked functions do not need to be recompiled. Instead the optimized compiled versions of these unrelated functions (in fully optimized machine code 112) may be used in partially optimized machine code 116. This leads to faster generation of partially optimized machine code 116 from marked source code 114. Faster compilation enhances developer productivity, as less time is spent by developers waiting for their code to compile.

Debugger tool 106 may receive partially optimized machine code 116. Debugger tool 106 is configured execute partially optimized machine code 116 to run a debugger session on the application represented by partially optimized machine code 116. For the portions of partially optimized machine code 116 that are not optimized, the developer has an enhanced debugging session, where the developer has an easier time co-relating instructions in the partially optimized machine code 116 to instructions of marked source code 114.

In an embodiment, while in a live debugging context, an interface is provided for a developer to indicate which code portion or segment (function or series of functions) is to have optimizations disabled for an enhanced debugging experience. Such functions are marked, thereby becoming marked functions. The marked functions and any functions determined to be affected by the marked functions, are recompiled with optimizations disabled to provide an improved debugging experience. The recompiled functions are patched into the existing optimized machine code. This patch may be performed in memory, such that the existing function implementations are appended with these new function implementations (build for purposes of debugging). Debugger tool 106 may then restore application state and resume control initially on the old function definitions. The next time a chosen function is invoked, debugger tool 106 now points to the debuggable versions of these function entities, allowing for an improved debugging experience.

The developer may further interact with set/unset optimizations interface 120 to select one or more functions within marked source code 114 for which optimized compilation was previously disabled, and for which optimized compilation is to be re-enabled. This causes the marking of such functions to be removed, which results in the generation of modified marked source code 126. Compiler 104 may receive modified marked source code 126 for compilation, to generate modified partially optimized machine code 128. In partially optimized machine code 128, the selected function(s) for which optimized compilation is to re-enabled are returned to an optimized state.

In a similar manner as described above, incremental compilation enabler 108 may enable compiler 104 to compile modified marked source code 126 into modified partially optimized machine code 128 in a more efficient manner. This is because just the functions of modified marked source code 126 for which marking has been removed, and any other functions that are affected by the removal of such markings, can be recompiled and used in modified partially optimized machine code 128. The functions of modified marked source code 126 that are unrelated to the functions for which marking has been removed do not need to be recompiled, and their compiled versions may be used from partially optimized machine code 116.

Further exemplary technical details concerning how code may be marked to disable and re-enable optimizations and for performing increment compilation in accordance with certain embodiment will be described in Section III below.

Figure 2:
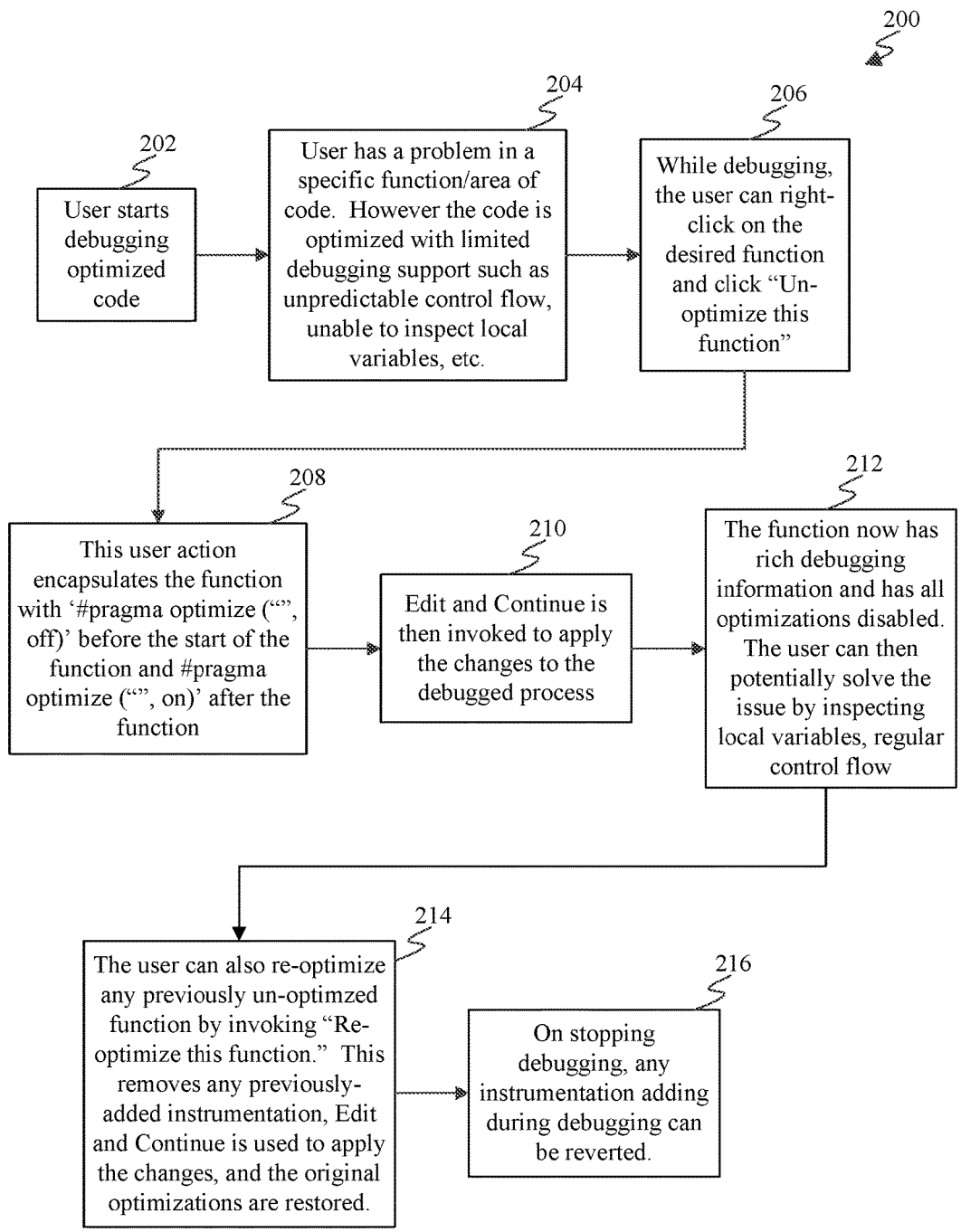
FIG. 2 depicts a flowchart of various interactions between a user and a software development system via which optimizations are dynamically set and unset for selected source code functions while the user is debugging optimized code.

To help illustrate some of the foregoing concepts, FIG. 2 depicts a flowchart 200 of various interactions between a user and a software development system, such as software development system 100 of FIG. 1, via which optimizations are dynamically set and unset for selected source code functions while the user is debugging optimized code. The method of flowchart 200 will now be described with continued reference to software development system 100 of FIG. 1 and with reference to different configurations of an example GUI of a software development system shown in FIGS. 3-8. The description of flowchart 200 is provided herein to help illustrate the aforementioned concepts by showing one specific implementation thereof. However, this description is by no means intended to be limiting.

As shown in FIG. 2, the method of flowchart 200 begins at step 202 in which a user starts to debug optimized code. For example, the user may utilize debugger tool 106 to start to debug fully optimized machine code 112, as discussed above in reference to FIG. 1.

At step 204, the user has a problem in a specific function or area of the code. Thus, the user would like to debug this function or area of the code. However, the code is optimized and, thus, there is limited debugging support such as unpredictable control flow, an inability to inspect local variables, or the like. Various other examples of how code optimization can lead to problems while debugging were discussed above.

Figure 3:
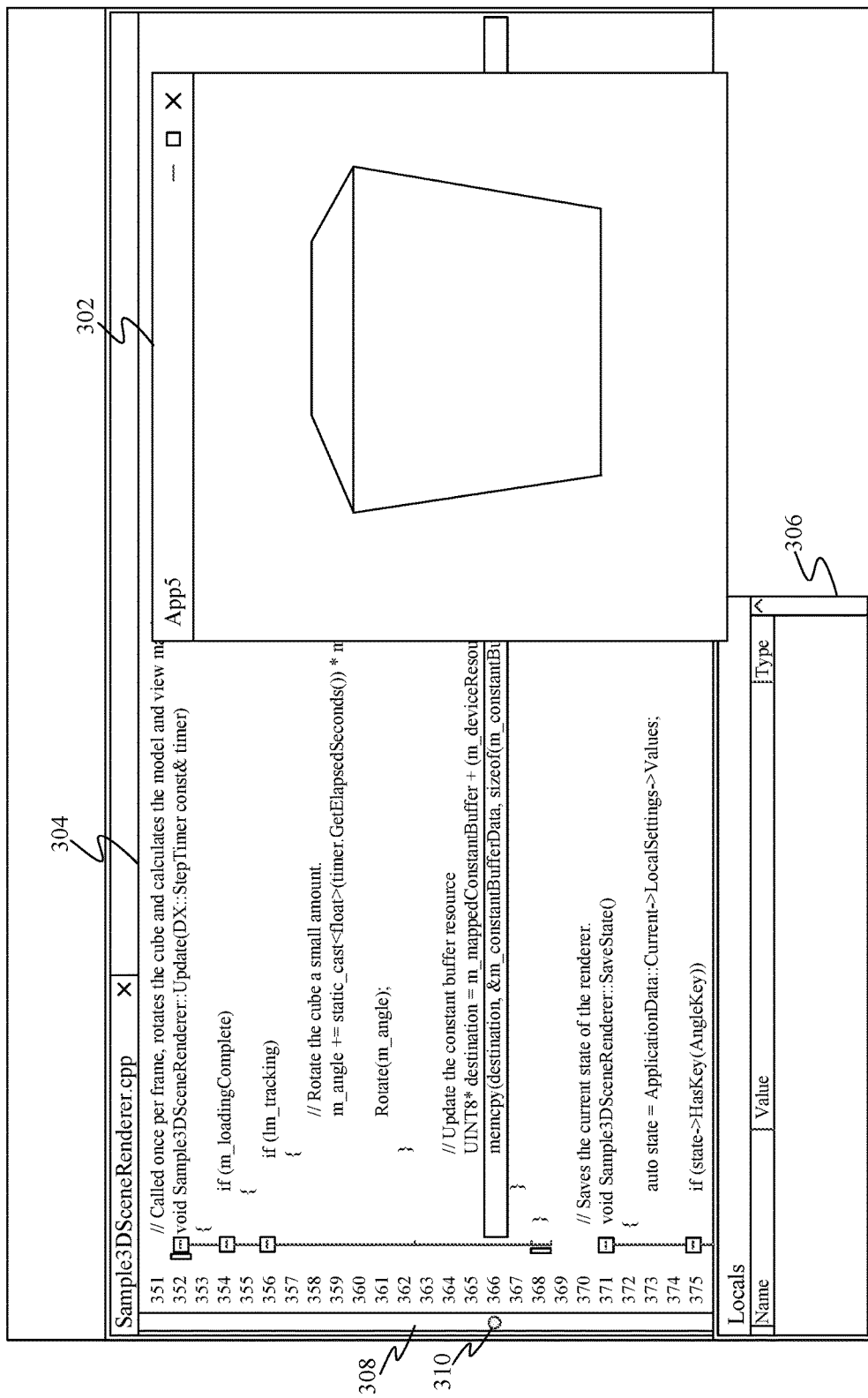

FIGS. 3 and 4 respectively depict a first configuration and a second configuration of an example GUI 300 of a software development system, such as software development system 100 of FIG. 1, that helps illustrate the debugging problems mentioned in step 204. In the example of FIG. 3, the user is debugging a graphics application called "App5" that is currently running and displaying a 3D object in a window 302. During this debugging session, the user may observe, edit and perform other operations with respect to the source code of the application in a window 304 (using, e.g., source code editor 102). For example, in this scenario, the user has set a breakpoint 310 in a C++ function called "Sample3DSceneRenderer::Update" within a source code file that is called "Sample3DSceneRenderer.cpp" by pointing and clicking on a gutter region 308 within window 304. When the breakpoint hits, the user may consult a window 306 labelled "Locals" to obtain information about various local variables.

FIG. 4 shows a configuration of GUI 300 after the breakpoint has hit. As shown in FIG. 4, the value of one local variable 402 called "destination" cannot be viewed within window 306 because it has been optimized away due to compiler optimizations, and a message 404 to that effect is displayed to the user. This inability to inspect a local variable is only one example of an undesired phenomenon that may be occur when debugging optimized code. As mentioned above, other undesired phenomenon may include but are not limited to an unpredictable control flow (e.g., the "hopping Program Counter" problem and the "cross-jumping" problem) and variables with unexpected values (e.g., the "roving variable" problem).

Figure 5:
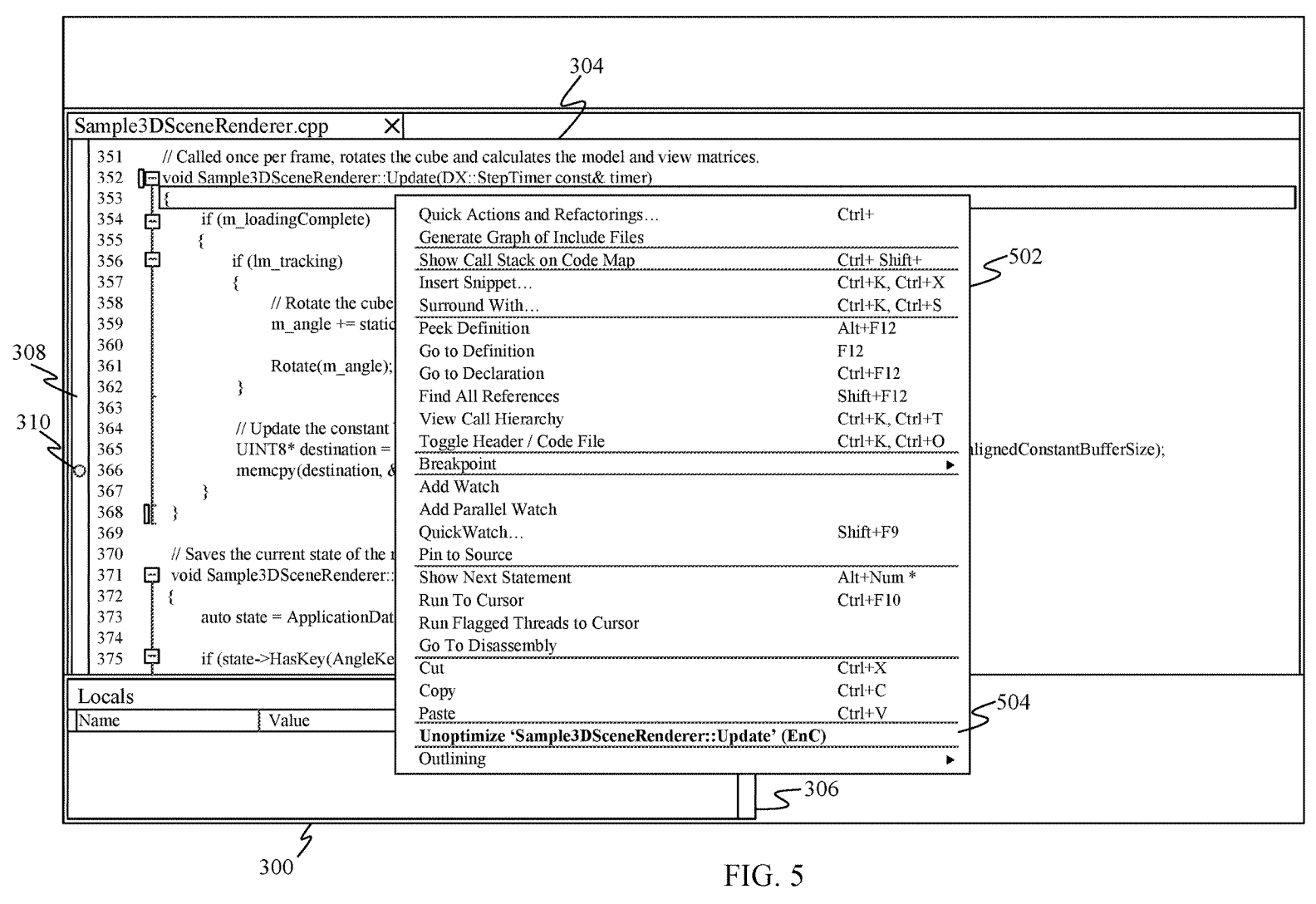

At step 206, while debugging, the user can right-click on a desired function to cause an "Unoptimize this function" option to be presented and then point and click on the "Unoptimize this function" option to cause the function to be unoptimized. This step is illustrated by a third configuration of GUI 300 that is depicted in FIG. 5. As shown in FIG. 5, the user has used a mouse to right-click within the body of the function "Sample3DSceneRenderer::Update." In response to this interaction, the software development system causes a menu 502 to be presented within GUI 300. Menu 502 includes a plurality of interactive control elements including one interactive control element 504 labelled "Unoptimize 'Sample3DSceneRenderer::Update' (EnC)." The user may activate interactive control element 504 by pointing and clicking on it to cause the function "Sample3DSceneRenderer::Update" to be unoptimized via an edit and continue operation, as will be discussed below.

Thus, in an embodiment, the software development system (e.g., software development system 100) includes logic that determines when a user is interacting with any portion of a representation of a particular function displayed within a user interface thereof. Such interaction may comprise a right click of a mouse button as discussed above, but may also include any of a wide variety of user interaction methods such as other types of mouse input (e.g., hovering over the function), keyboard input, touchscreen input, voice input, or the like.

Furthermore, in an embodiment, the software development system may be configured to determine whether the function that is being interacted with is one that is currently optimized or is currently unoptimized. If the function is determined to be optimized, then the software development system may present the "Unoptimize the function" option as discussed above, while if the function is determined to be unoptimized, then the software development system may not present such an option (and may instead present a "Re-optimize the function" option as will be discussed below). Although in the foregoing example the interactive control element for activating the "Unoptimize the function" option is presented as a member of a list of interactive control elements, persons skilled in the relevant art(s) will readily appreciate that other types of interactive control elements (e.g., a checkbox, a toggle switch, a button, or the like) may be used to activate the option.

At step 208, in response to user activation of the "Unoptimize the function" interactive control element, the software development system automatically encapsulates the relevant function between a first line of code ('#pragma optimize (" ", off)') and a second line of code ('#pragma optimize (" ", on)'). That is to say, the software development system automatically inserts a first line of code before the function and automatically inserts a second line of code is inserted after the function. These lines of code comprise language that is understood by an optimizing compiler (e.g., compiler 104) to mean that any function appearing between the two lines of code should be compiled with optimizations disabled.

Figure 6:
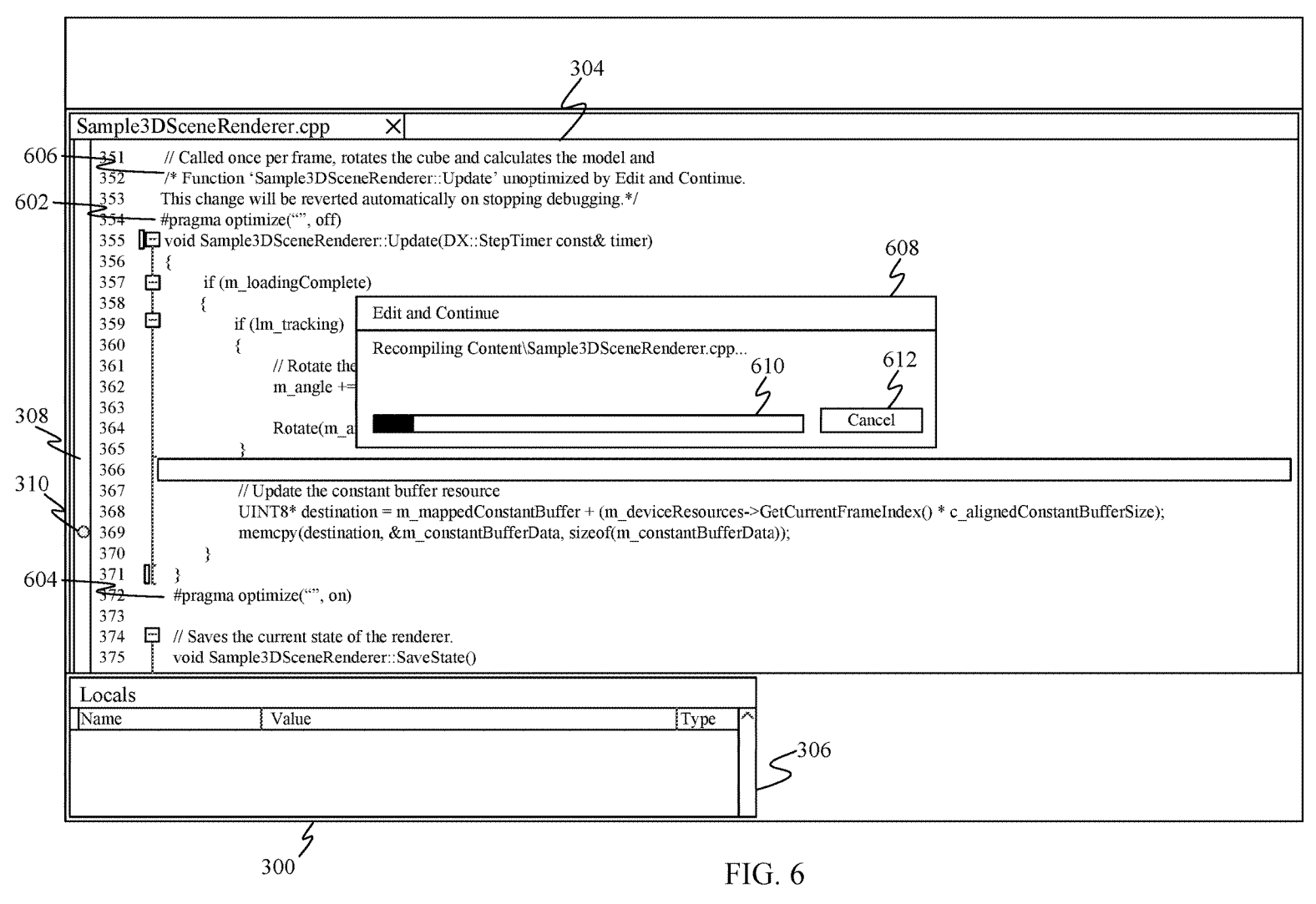

FIG. 6 shows a fourth configuration of GUI 300 in which it can be seen that the software development system has automatically inserted a first line of code 602 ('#pragma optimize (" ", off)') immediately before the function "Sample3DSceneRenderer::Update" and has automatically inserted a second line of code 604 ('#pragma optimize (" ", on)') after the same function in response to the user's activation of the "Unoptimize 'Sample3DSceneRenderer::Update' (EnC)" element 504 from menu 502. As noted above, this instrumentation or marking is used to alert the optimizing compiler (e.g. compiler 104) that the function encapsulated thereby should have optimizations disabled therefor. This inserted text can also serve as an indication or reminder to the user that the user has unset optimizations for this particular function. In some embodiments, the inserted text or markings may be displayed in window 304 using a color, font, font style, font size, or effect that is different than that used to display other source code included in the source code file so that the user may distinguish such text or markings from the original source code. As shown in FIG. 6, the software development system may also insert a comment within the source code that explains the purpose of the modification and how it can be removed. For example, as shown in FIG. 6, the comment may be: "/* Function 'Sample3DSceneRenderer:Update' unoptimized by Edit and Continue. This change will be reverted automatically on stopping debugging.*/".

Although in the foregoing example, the automatically-inserted markings or instrumentation comprise lines of code, persons skilled in the relevant art(s) will readily appreciate that other types of markings may be automatically inserted to indicate that a function should be compiled with optimizations disabled, such as tags, special characters, attributes, or the like. Furthermore, such markings may not encapsulate the function as in the present example. Rather, the markings may identify functions for which optimizations should be disabled in another manner. For example, and without limitation, the markings may comprise a table that is maintained in a header or other location of the marked source code that includes an identifier of one or more functions for which optimizations should be disabled.

At shown at step 210, in further response to the user's activation of the "Unoptimize 'Sample3DSceneRenderer::Update' (EnC)" element 504 from menu 502, the software development system automatically invokes an edit and continue operation to apply the changes that were made to the source code during step 208. For example, with continued reference to software development system 100 of FIG. 1, the automated insertion of the markings into the source code during step 208 results in the generation of marked source code 114 which is then compiled by compiler 104 to generate partially optimized machine code 116. As was previously discussed, partially optimized machine code 116 a partially optimized compiled representation of marked source code 114, with a non-optimized portion corresponding to the marked function(s) of marked source code 114, and a fully optimized remaining portion. In the context of a debugging session, this compiling step is carried out as part of an edit and continue operation. After the edit and continue operation completes, debugger tool 160 resumes the debugging session and begins referencing partially optimized machine code 116 for function execution rather than fully optimized machine code 112.

FIG. 6 illustrates that a new window 608 may be displayed within GUI 300 while the edit and continue operation is being carried out. As shown in FIG. 6, window 608 may include text that identifies which file is being recompiled (e.g., "Recompiling Content\Sample3DSceneRenderer.cpp"), a progress bar 610 that graphically illustrates how far the recompiling process has progressed, and a cancel button 612 that the user may interact with in order to cancel the edit and continue operation.

At step 212, the edit and continue operation has completed and optimizations have been disabled for the relevant function. Consequently, rich debugging information is now available for the function the user is trying to debug, and thus the user's debugging experience is improved. For example, FIG. 7 depicts a fifth configuration of GUI 300 after the edit and continue operation has completed and optimizations have been disabled for the function "Sample3DSceneRenderer::Update". As can be seen in FIG. 7, the breakpoint 310 has once again been hit, but this time, a value 704 held by local variable 402 ("destination") as well as a type 706 thereof can be observed from within window 306. Thus, the recompilation of the source code with optimizations disabled for the "Sample3DSceneRenderer::Update" has enabled the user to inspect local variables without any problems. As noted above, such recompilation can also help reduce or eliminate other problems associated with the debugging of optimized code.

At step 214, the user can also re-optimize any previously un-optimized function by invoking "Re-optimize this function." This has the effect of removing any previously-added instrumentation. An edit and continue operation is used to apply the changes, and the original optimizations are restored.

Thus, for example, while debugging, the user can right-click on a desired function for which optimizations were previously disabled to cause a "Re-optimize this function" option to be presented, and then activate the "Re-optimize this function" option by pointing and clicking on it to cause the function to be re-optimized. For example, with continued reference to FIG. 7, the user may use a mouse to right-click within the body of the function "Sample3DSceneRenderer::Update." In response to this interaction, the software development system may cause a menu to be presented within GUI 300. The menu may include a plurality of interactive control elements including one interactive control element labelled "Re-optimize Sample3DSceneRenderer::Update' (EnC)." The user may point and click on this interactive control element to cause the function "Sample3DSceneRenderer::Update" to be re-optimized via an edit and continue operation.

Thus, in an embodiment, the software development system (e.g., software development system 100) includes logic that determines when a user is interacting with a portion of a representation of a particular function displayed within a user interface thereof. Such interaction may comprise a right click of a mouse button as discussed above, but may also include any of a wide variety of user interaction methods such as other types of mouse input (e.g., hovering over a function), keyboard input, touchscreen input, voice input, or the like.

Furthermore, in an embodiment, the software development system may be configured to determine whether the function that is being interacted with is one that was previously unoptimized. If the function is determined to be one that was previously unoptimized, then the software development system may present a "Re-optimize the function" option, while if the function is determined to be optimized, then the software development system may not present such an option (and may instead present an "Unoptimize the function" option as was previously described). Although in the foregoing example the interactive control element for activating the "Re-optimize the function" option is described as being a member of a list of interactive control elements, persons skilled in the relevant art(s) will readily appreciate that other types of interactive control elements (e.g., a checkbox, a toggle switch, a button, or the like) may be used to activate the option.

In response to user activation of the "Re-optimize the function" interactive control element, the software development system automatically removes from the source code a first line of code ('#pragma optimize (" ", off)') and a second line of code ('#pragma optimize (" ", on)') that previously encapsulated the function. That is to say, the software development system automatically removes a first line of code that was previously inserted before the function and automatically removes a second line of code that was previously inserted after the function. These lines of code comprise language that is understood by an optimizing compiler (e.g., compiler 104) to mean that any function appearing between the two lines of code should be compiled with optimizations disabled.

Thus, for example, and with continued reference to FIG. 7, when a user activates an interactive control element labelled "Re-optimize 'Sample3DSceneRenderer::Update' (EnC)", the software development system will automatically remove first line of code 602 ('#pragma optimize (" ", off)') and second line of code 604 ('#pragma optimize (" ", on)') from the source code in the file Sample3DSceneRenderer.cpp. The software development system may also remove comment 606. In embodiments in which other forms of markings are used, such markings may also be automatically removed.

In further response to the user's activation of the "Re-optimize 'Sample3DSceneRenderer:Update' (EnC)" element from the menu, the software development system automatically invokes an edit and continue operation to apply the changes that were made to the source code. For example, with continued reference to software development system 100 of FIG. 1, the automated removal of the markings from the source code results in the generation of modified marked source code 126 which is then compiled by compiler 104 to generate modified partially optimized machine code 128. In the context of a debugging session, this compiling step is carried out as part of an edit and continue operation. As was previously discussed, in modified partially optimized machine code 128, the selected function(s) for which optimized compilation is to re-enabled are returned to their optimized state. After the edit and continue operation, debugger tool 160 resumes the debugging session and begins referencing modified partially optimized machine code 128 for function execution rather than partially optimized machine code 116.

Returning now to the description of FIG. 2, at step 216, on stopping debugging, any instrumentation adding during debugging can be reverted. Such reverting can be carried out manually by the developer or in an automated fashion by the software development system. That is to say, in an embodiment, the software development system (e.g., software development system 100) may be configured to determine that a user is terminating a debugging session, and in response to making such a determination, automatically remove any markings that were inserted into the source code as a result of the user's selection of functions for unoptimizing. For example, any instances of the lines '#pragma optimize (" ", off)' and '#pragma optimize (" ", on)' that were inserted into the source code (as well as any other types of markings) may be automatically removed from the source code upon terminating the debugging session. Accordingly, the user does not have to go through the source code and manually remove such instrumentation.

In an embodiment, software development system 100 is further configured to provide a mechanism that helps a developer track and monitor which functions in which files have been instrumented due to the selective disabling of optimizations during debugging. Such mechanism may comprise, for example, a window that includes a list of files having unoptimized functions and the unoptimized functions for each such file. This information may be presented, for example, using a tree view in which the files are the parent nodes and the unoptimized functions are the children. However, this is only one example, and various other user interface elements or mechanisms may be used to present a list of currently unoptimized functions to the user.

FIG. 8 depicts a sixth configuration of GUI 300 that includes such a mechanism. In particular, as shown in FIG. 8, GUI 300 includes a window 802 labelled "Optimized Debugging Assistant". The software development system utilizes window 802 to present a list of files having unoptimized functions and the unoptimized functions for each such file. In window 802, such information is arranged using a tree view in which the files are the parent nodes and the unoptimized functions are the children. Thus, as can be seen in FIG. 8, the current set of unoptimized functions includes the function "Sample3DSceneRenderer:Update", which is included in the source code file "Sample3DSceneRenderer.cpp". As more functions are unoptimized across different source code files, the software development system will add them to this table so that the developer can stay aware of which functions are currently in an unoptimized state.

In one embodiment, the software development system may provide an option to the user to automatically revert all instrumentation associated with the various files/functions shown in window 802. For example, the software development system may provide an interactive control element that the user may interact with, thereby activating it. Such activation may cause all of the markings that were automatically inserted into the source code due to the selective unoptimizing of functions by the user to be removed from the source code. Accordingly, the user does not have to go through the source code and manually remove such instrumentation.

The techniques described above for selectively disabling optimizations for functions within source code can be used in a development context as well as a debugging context. For example, set/unset optimizations interface 120 within source code editor 102 may be configured to enable a user to select functions from within source code for which optimizations should be enable during compiling. Similar user interface mechanisms to those described above can be utilized to allow a user to easily select functions for unoptimizing (e.g., by right-clicking on a function and selecting an unoptimized option from a menu), and in response to such selection, suitable instrumentation may be automatically inserted into the source code. However, in the development context, a compilation step is used to compile the modified source code without using an edit and continue operation.

In the foregoing, the unoptimizing of a function does not necessarily mean that all optimizations are disabled for the function. For example, in certain embodiments, only some optimizations (e.g., a subset of all possible optimizations) may be disabled for a given function based on the user's activation of an unoptimize option for the function. Which optimizations are disabled and which aren't may be a preconfigured aspect of the software development system. Alternatively, the software development system may provide the user with a mechanism (e.g., a user interface element) for selecting which optimizations should be disabled for a given function and which optimizations should remain enabled.

Likewise, the re-optimizing of a function as described herein does not necessarily mean that all optimizations are re-enabled for the function. For example, in certain embodiments, only some optimizations (e.g., a subset of all possible optimizations) may be re-enabled for a given function based on the user's activation of a re-optimize option for the function. Which optimizations are re-enabled and which aren't may be a preconfigured aspect of the software development system. Alternatively, the software development system may provide the user with a mechanism (e.g., a user interface element) for selecting which optimizations should be re-enabled for a given function and which optimizations should remain disabled.

Although the foregoing description refers to the selective disabling and re-enabling of optimizations for functions, it is to be understood that such description can equally apply to subroutines, methods, procedures, or any other portions of source code that are used to perform tasks.

To help illustrate the foregoing concepts, FIG. 9 depicts a flowchart 900 of a method for enabling a user that is debugging source code to select for unoptimizing a function from within the source code and to cause an edit and continue operation to be performed that produces a compiled version of the source code for continued debugging in which the selected function is unoptimized, while other functions remain optimized. The method of flowchart 900 may be performed, for example, by a software development system, such as software development system 100 as described above in reference to FIG. 1. However, the method of flowchart 900 is not limited to that embodiment.

As shown in FIG. 9, the method of flowchart 900 begins at step 902, in which the software development system determines that a user interacted with a representation of a function in a GUI thereof during a debugging session, the function comprising a portion of source code. In an embodiment in which the representation of the function comprises one or more lines of a function body, the software development system may determine that the user interacted with the representation of the function by determining that the user hovered over or clicked on at least one of the lines, although these are only some examples.

At step 904, in response to at least determining that the user interacted with the representation of the function, the software development system determines that the function is optimized in a compiled representation of the source code that is currently being referenced by the debugging session.

At step 906, in response to at least determining that the function is optimized, the software development system provides an interactive control within the GUI that the user can activate to unoptimize the function. In one embodiment, the software development system provides the interactive control within the GUI by presenting a menu item within a GUI that can be selected by the user to unoptimize the function, although this is only an example.

At step 908, in response to at least determining that the user activated the interactive control to unoptimize the function, the software development system automatically marks the function to generate an updated version of the source code, performs an edit and continue operation to build a compiled representation of the updated version of the source code in which at least one optimization is disabled for the function and in which optimizations are enabled for other functions of the updated version of the source code, and utilizes the compiled representation of the updated version of the source code to continue the debugging session.

In one embodiment, the software development system automatically marks the function by automatically adding at least a first line of code before the function and at least a second line of code after the function, although this is only an example. In further accordance with such an embodiment, the software development system displays the first line of code and the second line of the code within the GUI.

In a further embodiment, the method of flowchart 900 further includes presenting within the GUI a list of functions that have been unoptimized during the debugging session. For example, the software development system may present within the GUI a tree view that shows different functions that have been unoptimized across different files during the debugging session, although this is only an example.

In a still further embodiment, the method of flowchart 900 further includes determining that the user is ending the debugging session, and in response to determining that the user is ending the debugging session, removing at least the marking from the function. In further accordance with this example, the software development system may remove markings from all functions that were unoptimized during the debugging session in response to determining that the user is ending the debugging the session.

To further help in illustrating the foregoing concepts, FIG. 10 depicts a flowchart 1000 of a method for enabling a user that is debugging source code to select for re-optimizing a previously unoptimized function from within the source code and to cause an edit and continue operation to be performed that produces a compiled version of the source code for continued debugging in which the selected function is re-optimized. The method of flowchart 1000 may be performed, for example, by a software development system, such as software development system 100 as described above in reference to FIG. 1. However, the method of flowchart 1000 is not limited to that embodiment.

As shown in FIG. 10, the method of flowchart 1000 begins at step 1002, in which the software development system determines that a user interacted with a representation of a function in a GUI thereof during a debugging session, the function comprising a portion of source code. In an embodiment in which the representation of the function comprises one or more lines of a function body, the software development system may determine that the user interacted with the representation of the function by determining that the user hovered over or clicked on at least one of the lines, although these are only some examples.

At step 1004, in response to at least determining that the user interacted with the representation of the function, the software development system determines that the function comprises a function that was previously unoptimized while building a compiled representation of the source code that is currently being referenced by the debugging session.

At step 1006, in response to at least determining that the function comprises a function that was previously unoptimized, the software development system provides an interactive control within the GUI that the user can activate to re-optimize the function. In one embodiment, the software development system provides the interactive control within the GUI by presenting a menu item within a GUI that can be selected by the user to re-optimize the function, although this is only an example.

At step 1008, in response to at least determining that the user activated the interactive control to re-optimize the function, the software development system automatically removes a marking from the function to generate an updated version of the source code, performs an edit and continue operation to build a compiled representation of the updated version of the source code in which at least one optimization is re-enabled for the function and in which optimizations remain enabled for other functions of the updated version of the source code, and utilizes the compiled representation of the updated version of the source code to continue the debugging session.

In one embodiment, the software development system automatically removes the marking from the function by automatically removing at least a first line of code from before the function and removing at least a second line of code from after the function, although this is only an example.

In a further embodiment, the method of flowchart 1000 further includes presenting within the GUI a list of functions that have been unoptimized during the debugging session. For example, the software development system may present within the GUI a tree view that shows different functions that have been unoptimized across different files during the debugging session, although this is only an example.

To still further help in illustrating the foregoing concepts, FIG. 11 depicts a flowchart 1100 of a method for enabling a user that is developing source code to select a function from within the source code for which optimization should be prevented and to cause a compiled representation of the source code to be built in which the selected function is unoptimized, while other functions are optimized. The method of flowchart 1100 may be performed, for example, by a software development system, such as software development system 100 as described above in reference to FIG. 1. However, the method of flowchart 1100 is not limited to that embodiment.

As shown in FIG. 11, the method of flowchart 1100 begins at step 1102, in which the software development system determines that a user interacted with a representation of a function in a GUI thereof, the function comprising a portion of source code. In an embodiment in which the representation of the function comprises one or more lines of a function body, the software development system may determine that the user interacted with the representation of the function by determining that the user hovered over or clicked on at least one of the lines, although these are only some examples.

At step 1104, in response to at least determining that the user interacted with the representation of the function, the software development system provides an interactive control within the GUI that the user can activate to prevent optimization of the function. In one embodiment, the software development system provides the interactive control within the GUI by presenting a menu item within a GUI that can be selected by the user to prevent optimization of the function, although this is only an example.

At step 1106, in response to at least determining that the user activated the interactive control to prevent optimization of the function, the software development system automatically marks the function to generate an updated version of the source code. In one embodiment, the software development system automatically marks the function by automatically adding at least a first line of code before the function and at least a second line of code after the function, although this is only an example. In further accordance with such an embodiment, the software development system displays the first line of code and the second line of the code within the GUI.

At step 1108, the software development system builds a compiled representation of the updated version of the source code in which at least one optimization is disabled for the function and in which optimizations are enabled for other functions within the updated version of the source code.

Although the foregoing description refers to techniques by which a user can select functions from within source code while interacting with a GUI, persons skilled in the art will appreciate that analogous techniques may be used for systems that utilize other kinds of user interfaces. For example, for voice-based user interfaces, a user may utter the name of a function or otherwise vocally direct the software development system to a particular function within source code that is to be unoptimized or re-optimized. Likewise, for virtual reality or augmented reality systems, tracked movement of a body part or worn accessory may be used to determine target functions for unoptimizing and re-optimizing. Still other user interface types may be used to implement the foregoing techniques.

III. Example Techniques for Building Partially Optimized Code

This section will provide further technical details concerning how a compiled representation of source code may be built with certain functions selectively unoptimized and others optimized. Additional details may also be found in commonly-owned co-pending U.S. patent application Ser. No. 14/315,111, entitled "Techniques for Edit-and-Continue and Enhanced Debugging on Optimized Code" and filed on Jun. 25, 2014, the entirety of which is incorporated by reference herein. However, it is noted that the embodiments described in the preceding section are not limited to this implementation.

Software development system 100 of FIG. 1 may enable the automatic marking of code, and the compiling of the code in a partially optimized manner to enhance debugging of the code, in various ways. For instance, in an embodiment, software development system 100 may operate according to FIG. 12. FIG. 12 shows a flowchart 1200 providing a process to disable optimized compilation for a portion of source code, and to compile the source code, according to an example embodiment. Flowchart 1200 is described as follows with respect to FIG. 1. Further structural and operational embodiments will be apparent to persons skilled in the relevant art(s) based on the following description.

Flowchart 1200 begins with step 1202. In step 1202, an interface is provided that is configured to enable a user to automatically mark a portion of a source code for which to disable optimized compilation. As described above with respect to FIG. 1, code editor 102 may include set/unset optimizations interface 120. Set/unset optimizations interface 120 is an interface provided by code editor 102 to enable a developer to select functions for unoptimizing, which causes software development system to automatically mark source code, thereby generating marked source code 114.

In step 1204, a partially optimized compiled representation of the marked version of the source code is built with optimizations disabled at least for the marked portion and optimizations enabled for other portions of the marked source code. In an embodiment, Compiler 104 is configured to receive and compile marked source code 114 to generate partially optimized machine code 116. Partially optimized machine code 116 a partially optimized compiled representation of marked source code 114, with a non-optimized portion corresponding to the marked function(s) of marked source code 114, and a fully optimized remaining portion. For instance, compiler 104 may include incremental compilation enabler 108 to enable incremental compilation to be performed, where portions of source code (e.g., marked portions, portions affected by modifications thereto, etc.) are recompiled rather than a full compilation of the source code, which can take significantly longer. Compiler 104 may insert the recompiled portions into fully optimized machine code 112 (in place of the optimized machine code versions of the marked portions) to generate partially optimized machine code 116.

Note that partially optimized machine code 116 may be generated after a debugger session has been initiated on fully optimized machine code 112, or without a debugger session being initiated on fully optimized machine code 112 at all. For instance, in an embodiment, compiler 104 may generate fully optimized machine code 112 based on source code 110, debugger tool 106 may receive fully optimized machine code 112 to begin a debug session, the developer may edit source code 110 during the debug session to generate marked source code 114, and partially optimized machine code 116 may then be generated by compiler 104 from marked source code 114 and fully optimized machine code 112. Alternatively, in another embodiment, the developer may edit source code 110 to generate marked source code 114 prior to beginning a debug session, compiler 104 may generate fully optimized machine code 112, and then generate partially optimized machine code 116 from marked source code 114 and fully optimized machine code 112, and the debug session may be initiated by debugger tool 106 on partially optimized machine code 116.

Compiler 104 may be configured in various ways, and step 204 may be performed in various ways in embodiments. For instance, FIG. 13 shows a flowchart 1300 providing a process for compiling source code in which optimized compilation of some functions of the source code is disabled, according to an example embodiment. Flowchart 1300 of FIG. 13 is an example of step 1204 of FIG. 12. Furthermore, FIG. 14 shows a block diagram of a compiler 1400 configured to perform full and incremental compilation of source code, according to an example embodiment. Compiler 1400 of FIG. 14 is an example of compiler 104 of FIG. 1. As shown in FIG. 14, compiler 1400 is communicatively coupled with storage 1402. Furthermore, as shown in FIG. 14, compiler 1400 includes a compiler front end 1404 and a compiler back end 1406. Compiler back end 1406 includes a compilation module 1408 and an incremental compilation enabler 1410. Incremental compilation enabler 1410 is an example of incremental compilation enabler 108 of FIG. 1. Incremental compilation enabler 1410 includes a marked/edited code determiner 1412, an affected function determiner 1414, and a code assembler 1416. Compilation module 1408 includes a code analyzer 1436.

Compiler 1400 is described with respect to flowchart 1300 for purposes of illustration. Further structural and operational embodiments will be apparent to persons skilled in the relevant art(s) based on the following description of flowchart 1300 and compiler 1400. Note that the steps of flowchart 1300 do not necessarily have to occur in the order shown, as the order shown is provided for ease of illustration, and not for reasons of limitation.

Flowchart 1300 of FIG. 13 begins with step 1302. In step 1302, a fully optimized compiled representation of the source code with optimizations enabled is built for an entirety of the source code. For example, with reference to FIG. 14, compiler front end 1404 may receive source code 110. Source code 110 contains program code written in a programming language, such as a high level programming language (e.g., C, C++, Java, etc.). Compiler front end 1404 is configured to generate an intermediate language (IL) representation 1418 of received source code, such as source code 110. Compiler front end 1404 may additionally perform optional functions such as verifying syntax and semantics, performing type checking, stripping out comments, etc., to generate IL representation 1418.

IL representation 1418 generated by compiler front end 1404 is an IL version of source code 110 that includes code-improving transformations relative to a high level programming language used for source code 110. Source code 110 may be converted into code of any suitable intermediate language by compiler front end 404, including C, Microsoft®'s Common Intermediate Language (CIL), etc. Accordingly, compiler front end 1404 may be configured in any manner to convert source code 110 to IL representation 1418, as would be known to persons skilled in the relevant art(s).

Furthermore, as shown in FIG. 14, compiler back end 1406 receives IL representation 1418. Compiler back end 1406 is configured to perform full compilation of received IL code as well as incremental compilation of received IL code. For instance, with respect to IL representation 1418, compiler back end 1406 uses compilation module 1408 to perform full compilation. In particular, compilation module 1408 receives IL representation 1418, and is configured to compile code of IL representation 1418, with optimizations, into fully compiled machine code 112. Compilation module 1408 may be configured to compile received IL code into compiled machine code in any manner, with any number of optimizations described elsewhere herein or otherwise known. Fully compiled machine code 112 may be included in a file (e.g., an object file), or may be created/stored in another form, to form an executable program or application that may be executed by one or more processors. Furthermore, debugger tool 106 of FIG. 1 may receive and debug fully compiled machine code 112.

As shown in FIG. 14, IL representation 1418 and fully compiled machine code 112 may be stored in storage 1402. Storage 1402 is an example of storage 124 in FIG. 1. Storage 1402 may include one or more of any type of storage medium/device to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium/device. Note that IL representation 1418 is optionally stored in storage 1402.

In an embodiment, compiler back end 1406 may be configured to generate information regarding source code 110 that may be used to assist incremental compilation. For instance, step 1302 may include a step 1502 shown in FIG. 15. In step 1502, an incremental program database is generated that at least indicates dependencies between functions of the fully optimized compiled representation of the source code. For instance, step 1502 may be performed by code analyzer 1436. Code analyzer 1436 is configured to analyze IL representation 1418 to determine functions of IL representation 1418 (and thereby, of source code 110) that are affected by changed functions and/or variables. As shown in FIG. 14, IPDB (incremental program database) 1422 may be generated by code analyzer 1436. Code analyzer 1436 may generate IPDB 1422 to include function attributes and variable attributes determined from IL representation 1418 in any manner described herein. As shown in FIG. 14, IPDB 1422 may be stored in storage 1402 (e.g., in the form of one or more files, a database, and/or any other data structure).

For instance, attributes of IL representation 1418 may be determined by code analyzer 1436 and stored in IPDB 1422. Examples of attributes of IL representation 1418 that may be determined include function attributes that are considered declared ("source") function attributes and computed function attributes. Declared attributes are attributes that are present in source code 110, and examples of declared function attributes include dllimport, dllexport, a number of formal parameters, etc. Examples of function attributes that may be computed include a checksum for each function, an indication of whether a function can throw any exceptions, etc. Still further, declared attributes and/or computed attributes may be determined for variables, and stored in IPDB 1422. An example of a computed variable attribute is an indication of whether a variable always has a constant value when executing a function. Further examples of the determination of attributes of IL representation 1418 are described elsewhere herein.

Note that although code analyzer 1436 is shown included in compiler back end 1406 (in compilation module 1408) in FIG. 14, in an alternative embodiment, code analyzer 1436 may be included in compiler front end 1404.

Referring back to FIG. 13, in step 1304, one or more functions of the source code to be recompiled with optimizations disabled is/are determined based at least on the marked portion. With reference to FIG. 14, compiler front end 1404 may receive marked source code 114. Compiler front end 1404 is configured to generate an intermediate language (IL) representation 1424 of marked source code 114. Marked/edited code determiner 1412 receives marked source code 114. Marked/edited code determiner 1412 is configured to determine the marked functions in IL representation 1424 (or directly in marked source code 114). For instance, marked/edited code determiner 1412 may be configured to parse in IL representation 1424 (or marked source code 114) for the comments, tags, special characters, a table of marked functions, etc., that indicate the functions that were marked. The determined marked functions are to be compiled without optimizations by compilation module 1408. As shown in FIG. 14, marked/edited code determiner 1412 outputs marked functions 1440, which indicates the determined marked functions.

Furthermore, functions of marked source code 114 that are affected by the marked functions are determined so that those affected functions are also compiled without optimizations by compilation module 1408. Those affected functions may be determined in various ways.

For instance, FIG. 16 shows a flowchart 1600 providing a process for determining functions to be compiled with optimizations disabled using a dependence graph, according to an example embodiment. In an embodiment, flowchart 1600 may be performed by compiler 1400 of FIG. 14. Further structural and operational embodiments will be apparent to persons skilled in the relevant art(s) based on the following description of flowchart 1600. Note that the steps of flowchart 1600 do not necessarily have to occur in the order shown.

Flowchart 1600 of FIG. 16 begins with step 1602. In step 1602, a dependence graph is generated for the source code based on the incremental program database. For instance, FIG. 17 shows a block diagram of code analyzer 1436, according to an example embodiment. As shown in FIG. 17, code analyzer 1436 includes a dependence graph generator 1702. Dependence graph generator 1702 is configured to generate a dependence graph 1704 based on IPDB 1422 that includes data that represents dependencies between functions and variables of source code 110. These dependencies may be traversed to determine other functions affected by marked functions present in marked source code 114. Dependence graph 1704 may be stored in IPDB 1422 (e.g., in storage 1402) or elsewhere. Dependence graph 1704 may be generated at any time, including at a time source code 110 is compiled and/or IPDB 1422 is generated (e.g., during step 1502 of FIG. 15) or at another time.

Dependence graph generator 1702 may operate in any manner to perform its functions. For instance, FIG. 19 shows a flowchart 1900 providing a process for generating a dependence graph, according to an example embodiment. In an embodiment, dependence graph generator 1702 may operate according to flowchart 1900. Dependence graph generator 1702 is described with respect to flowchart 1900 for purposes of illustration. Further structural and operational embodiments will be apparent to persons skilled in the relevant art(s) based on the following description of flowchart 1900 and dependence graph generator 1702. Note that the steps of flowchart 1900 do not necessarily have to occur in the order shown.

Flowchart 1900 of FIG. 19 begins with step 1902. In step 1902, a node is associated with each variable and with each function of the source code to designate a plurality of nodes. In an embodiment, dependence graph generator 1702 parses IL representation 1418 for all functions. Dependence graph generator 1702 may identify a function in IL representation 1418 in any manner, including by identifying the declaration of a function (e.g., a function name followed by "( )"), identifying the body of a function (e.g., enclosed in bracket symbols "{", "}"), and/or by identifying other parts of a function. Dependence graph generator 1702 may also identify a global variable in IL representation 1418 in any manner, including by identifying the declaration of a global variable (e.g., "extern int globalvariable=1;"), etc. Dependence graph generator 1702 is configured to identify each function and each variable at least with a corresponding node (e.g., with a node identifier) in dependence graph 1704.

For instance, each node in dependence graph 1704 may be associated with one or more attributes derived from IPDB 1422, such as a name, a module identifier, and a symbol index. Function nodes in dependence graph 1704 may further include one or more of the attributes of a checksum, an address taken, a tuple count, a Dllimport, a function signature, a noexcept, nothrow, dead catch information, etc. Variable nodes in dependence graph 1704 may further include one or more the attributes of a constant, read only, volatile, address taken, size, dllimport, etc.

In step 1904, a first set of directed edges is determined, each directed edge of the first set extends from a first function node to a second function node of the dependence graph to indicate that a change in the function associated with the first function node affects the function associated with the second function node. In an embodiment, dependence graph generator 1702 analyzes IL representation 1418 to determine dependencies between functions. For instance, dependence graph generator 1702 may determine when a first function (callee function) is called by a second function (caller function), such that changes in the first function affect the second function. Thus, dependence graph generator 1702 may be configured to parse the structure of each function in IL representation 1418 to determine what other function(s) the function calls, if any. Dependence graph generator 1702 is configured to identify each function call as a "directed edge" (e.g., with an edge identifier) in dependence graph 1704. Each directed edge identifies a first function node and a second function node, to indicate that the function associated with the second function node is dependent on (e.g., calls) the function associated with the first function node. Furthermore a directed edge between functions may indicate a type of dependency between the functions (e.g., an inline edge from a first function node to a second function node, where the function associated with the second function node inlines the function associated with the first function node, etc.).

In step 1906, a second set of directed edges is determined, each directed edge of the second set extends from a variable node to a third function node of the dependence graph to indicate that a change in the variable associated with the variable node affects the function associated with the third function node. In an embodiment, dependence graph generator 1702 analyzes IL representation 1418 to determine dependencies between variables and functions. For instance, dependence graph generator 1702 may determine when a variable is used by a function, such that changes in the variable (e.g., a change to a variable attribute) affect the function. Thus, dependence graph generator 1702 may be configured to parse the structure of each function in IL representation 1418 to determine what variables the function uses, if any. Dependence graph generator 1702 is configured to identify each variable-function relationship as a "directed edge" (e.g., with an edge identifier) in dependence graph 1704. Each directed edge identifies a variable node and a function node, to indicate that the function associated with the function node is dependent on (e.g., uses) the variable associated with the variable node.

In step 1908, a dependence graph is stored that includes the plurality of nodes, the first set of directed edges, and the second set of directed edges. As shown in FIG. 17, dependence graph generator 1702 outputs dependence graph 1704. Dependence graph 1704 may be stored in IPDB 1422 in storage 1402, as shown in FIG. 14.

Note that dependence graph generator 1702 may generate dependence graph 1704 at any time, including at a time at which IL representation 1418 is compiled into fully compiled machine code 112 by compilation module 1408, at a time prior to generation of IL representation 1424, or at a time after IL representation 1424 is generated.

For illustrative purposes, FIG. 20 shows a graphical representation of a portion of an exemplary dependence graph 2000, according to an embodiment. As shown in FIG. 20, dependence graph 2000 includes nodes and directed edges, including function nodes 2002a-2002c, variable nodes 2004a-2004c, and directed edges 2006a-2006c and 2008a-2008e. Each of function nodes 2002-2002c is associated with a corresponding one of functions F1-F3 included in IL representation 1418. Each of variable nodes 2004-2004c is associated with a corresponding one of variables V1-V3 included in IL representation 1418. Function nodes 2002-2002c and variable nodes 2004-2004c may be identified by dependence graph generator 1702 in step 1902 of flowchart 1900. Three functions and three variables are shown in FIG. 20 for purposes of brevity, and further numbers of functions and variables may be present (as indicated by dotted line directed edges 2006c and 2008e).

Furthermore, each of directed edges 2006a-2006c extends from a first function node to a second function node. For instance, directed edge 2006a extends from function node 2002a to function node 2002b, indicating that a change in function F1 associated with function node 2002a affects function F2 associated with function node 2002b (F2 is dependent on F1). Directed edges 2006a-2006c may be identified by dependence graph generator 1702 in step 1904 of flowchart 1900.

Each of directed edges 2008a-2008e extends from a variable node to a function node. For instance, directed edge 2008a extends from variable node 2004a to function node 2002a, indicating that a change in variable V1 associated with variable node 2004a affects the function F1 associated with function node 2002a (F1 is dependent on V1). Directed edges 2008a-2008e may be identified by dependence graph generator 1702 in step 1906 of flowchart 1900.

Referring back to FIG. 16, in step 1604, the dependence graph is traversed from any functions and any variables included in the marked portion to determine a set of affected functions. In an embodiment, affected function determiner 1414 is configured determine a set of functions present in source code 110 that are affected by marked functions 1440 of marked source code 114. Affected function determiner 1414 may make this determination in any manner.

For instance, FIG. 18 shows a block diagram of affected function determiner 1414, according to an example embodiment. As shown in FIG. 18, affected function determiner 1414 includes a dependence graph analyzer 1802. Dependence graph analyzer 1802 is configured to analyze dependence graph 1704 to determine functions affected by marked functions 1440.

Dependence graph analyzer 1802 may operate in any manner to perform its functions. For instance, FIG. 21 shows a flowchart 2100 providing a process for analyzing a dependence graph, according to an example embodiment. In an embodiment, dependence graph analyzer 1802 may operate according to flowchart 2100. Dependence graph analyzer 1802 is described with respect to flowchart 2100 for purposes of illustration. Further structural and operational embodiments will be apparent to persons skilled in the relevant art(s) based on the following description of flowchart 2100 and dependence graph analyzer 1802.

Flowchart 2100 of FIG. 21 begins with step 2102. In step 2102, directed edges of the first set of directed edges are traversed from a node for each function in the marked portion to determine first affected functions. In an embodiment, for each marked function indicated in marked functions 1440, dependence graph analyzer 1802 is configured to find the corresponding function node in dependence graph 1704. Dependence graph analyzer 1802 traverses any directed edges indicated in dependence graph 1704 from the function node to determine any (dependent) function node(s). These dependent function nodes are indicated in a set of first affected functions.

For example, with reference to FIG. 20, if function F1 is a marked function, dependence graph analyzer 1802 identifies and traverses directed edges 2006a and 2006b to function nodes 2002b and 2002c, respectively, to determine that functions F2 and F3 are dependent on function F1. Functions F2 and F3 are thereby included in the first affected functions.

Referring back to FIG. 21, step 2104 is not performed with respect to determining affected functions based on marked source code.

Referring back to FIG. 16, in step 1606, any functions in the marked portion and any functions in the determined set of affected functions are included in a set of functions to be recompiled with optimizations disabled. As shown in FIG. 18, dependence graph analyzer 1802 generates an affected set of functions 1430. Affected set of functions 1430 includes the first affected functions determined by dependence graph analyzer 1802 in step 2102. FIG. 14 also shows second set of functions 1430 output by affected function determiner 1414. As shown in FIG. 14, compilation module 1408 receives marked functions 1440 and affected functions 1430, which comprise the set of functions to be recompiled with optimizations disabled.

Referring back to FIG. 13, in step 1306, the determined one or more functions is/are recompiled with optimizations disabled. As shown in FIG. 14, compilation module 1408 receives marked functions 1440 and affected functions 1430. Compilation module 1408 is configured to compile the functions included in marked functions 1440 and affected set of functions 1430 without optimizations disabled to generate compiled functions 1432. Compilation module 1408 may be configured to compile marked functions 1440 and affected set of functions 1430 in any manner, including according to techniques described elsewhere herein or otherwise known.

Note that in an embodiment, code analyzer 1436 may be configured to generate an IPDB 1422 for IL representation 1424 of marked source code 114, in a similar manner as described above for IL representation 1418 with respect to step 1502 (FIG. 15). The IPDB 1422 generated for IL representation 1424 of marked source code 114 may be maintained in memory 1438, in storage 1402, or elsewhere.

In step 1308, the recompiled one or more functions are patched into the fully optimized compiled representation of the source code to generate the partially optimized compiled representation. As shown in FIG. 14, code assembler 1416 of incremental compilation enabler 1410 receives fully compiled machine code 112 and compiled functions 1432. Code assembler 1416 is configured to insert compiled functions 1432 in fully compiled machine code 112 to generate partially optimized machine code 116. In particular, code assembler 1416 may be configured to insert compiled functions 1432 in fully compiled machine code 112 in place of the functions indicated in marked functions 1440 (functions that were marked by the developer for no optimizations) and second set of functions 1430 (functions that were affected by the marked functions). In this manner, partially optimized machine code 116 is generated as a partially compiled representation of marked source code 114 without recompiling modified source code 114 in its entirety.

Note that in an embodiment, partially optimized machine code 116 may be stored in a memory 1438 (e.g., a cache memory in a memory device, or other short term memory) and subsequently for debug operations as described herein. In this manner, when debug operations are finished, partially optimized machine code 116 is not maintained, and instead, fully optimized machine code 112 is maintained for subsequent use as an application, if desired.

Note that the embodiments of compilers described herein may be implemented in any type of compile or build configuration, which may or may not include linkers. For instance, FIG. 22 shows a block diagram of a build system 2200 that includes a compiler 2202 and a linker 2204, according to an example embodiment. Build system 2200 is configured to perform link time code generation (LTCG), also referred to as whole program optimization. According to LTCG, source code is received in the form of multiple separate source code files. The multiple separate source code files together form a whole program for compilation. All of the source code files are compiled together by build system 2200 to form a single executable. An example of the operation of build system 2200 to perform LTCG is described as follows.

As shown in FIG. 22, compiler 2202 includes a compiler front end 2206 and a compiler back end 2208. Compiler front end 2206 may be configured similarly to compiler front end 1404 of FIG. 14, and compiler back end 2208 may be configured similarly to compiler back end 1406 of FIG. 14, or they may be configured according to other embodiments. Compiler back end 2208 includes incremental compilation enabler 108. In an embodiment, incremental compilation enabler 108 may be configured similarly to incremental compilation enabler 1410 shown in FIG. 14, or may be configured according to another embodiment.

Source code 110 is received by compiler front end 2206 in the form of multiple source code files (e.g., ".c" files, ".cpp" files, etc.). Any number of source code files may be received as source code 110, including numbers of files in the ones, tens, hundreds, thousands, etc. Compiler front end 2206 converts the source code of each source code file into a corresponding IL representation file, thereby generating multiple IL representation files. The IL representation files are output by compiler front end 2206 in IL representation 1418. Compiler back end 2208 receives IL representation 1418. Compiler back end 2208 determines by a command line switch (e.g., "/GL"), by analysis of information in one or more of the IL representation files, or in another manner, that LTCG is invoked. Due to this, compiler back end 2208 passes the IL representation files to linker 2204 (e.g., packaged in .obj files, or other form) as packaged IL representation files 2210.

Linker 2204 receives packaged IL representation files 2210. Based on determining that IL code is contained in the files of packaged IL representation files 2210, by being invoked by a command line switch (e.g., "/LTCG"), or in another manner, linker 2204 determines that compiler back end 2208 is to be invoked to optimize the IL code across all of the IL representation files (rather than optimizing each IL representation file individually). Accordingly, linker 2204 generates an invocation signal 2218, which is received by compiler back end 2208.

Compiler back end 2208 receives invocation signal 2218, and proceeds to compile the IL representation files together into a single machine code file, which is output by compiler back end 2208 as machine code 2220. Linker 2204 receives machine code 2220, and is configured to generate an executable file 2212, optionally using one or more LIB (library) files, DLL (dynamic-link library) files, etc.

With reference to flowchart 1300 FIG. 13, IL representation 1418 and machine code 2220 may be stored in storage 1402 of FIG. 14 (step 1304). Additionally, IPDB 1422 may be generated by compiler front end 1404 and/or compiler back end 2208 (e.g., by code analyzer 1436 of FIG. 14) and stored in storage 1402.

Subsequently, a developer may modify code in one or more of the source code files. The developer may invoke compiler 2202 for an incremental compile (e.g., using a command "-incremental" switch, or otherwise). The modified source code files (including the modified and non-modified source code files) may be received in FIG. 22 as modified source code 114. Compiler front end 2206 may generate revised IL representation 1424, which includes an IL representation file for each source code file in modified source code 114. Compiler back end 2208 receives the IL representation files in revised IL representation 1424, and passes them to linker 2204 in a similar fashion as described above in revised packaged IL representation files 2214. Linker 2204 receives revised packaged IL representation files 2214, and in response, determines that compiler back end 2208 is to be invoked to optimize the IL code across all of the IL representation files (rather than optimizing each IL file, linker 2204 generates invocation signal 2218 to cause compiler back end 2208 to perform incremental compilation of the revised IL representation files.

Accordingly, compiler back end 2208 receives invocation signal 2218, receives the revised IL representation files, and proceeds to perform incremental compilation according to flowchart 1300 of FIG. 13. As described above, only the modified and affected functions of the single machine code file of machine code 2220 are compiled. Note that according to the techniques described above, modified functions and/or variables in one or more IL representation files may be determined. Furthermore, one or more functions that are affected by the modified functions and/or variables may be determined. The affected functions may be present in the same IL representation files as the modified functions and/or variables that affect them, or may be included in different files. For instance, a variable in a first file may affect a function in a second file, or a function in a third file may affect a function in a fourth file. Because dependence graph generator 1702 is configured to generate dependence graph 1704 based on all of the IL representation files, the affected functions may be found in any of the IL representation files.

The compiled functions are inserted into machine code 2220 (replacing the modified and affected compiled functions) to generate recompiled machine code 2222. Linker 2204 receives recompiled machine code 2222, and is configured to generate an executable file 2216 based thereon.

In this manner, embodiments of incremental compilation may be incorporated in LTCG compilation implementations.

A "callee" function is a function in source code that is called by another function of the source code, referred to as a "caller" function, to be performed. A callee function may be called any number of times by any number of caller functions. In this manner, the code of the callee function is reusable and can be present in the source code once, without having to be duplicated in each of the caller functions.

Note that the embodiments of compilers described herein may be configured to handle incremental compilation with regard to "inlining" of functions. "Inlining" is a compiler optimization where code of a callee function is substituted into the body a caller function during compilation of the source code (in place of the call). As such, inlining has benefits: the runtime overhead of a call instruction can be avoided, because the callee function code can be executed as though it were a part of the caller. Another benefit is that inlining enables more aggressive optimization because the optimizer (e.g., the compiler back end) has call-site specific information when optimizing the body of the inlined caller. So inlining can be an important optimization that affects program performance. Inlining uses heuristics to decide when to inline a callee. Too much inlining can cause a large increase in the size of a machine code binary, which can have negative impact.

In an embodiment, it may be desired for machine code generated from modified source code by an incremental build (e.g., recompiling a portion of the source code that was affected by modifications to the source code according to the embodiments described herein) to be no different from the machine code generated from the modified source code by a full build (recompiling the modified source code entirely from scratch). Such a no-difference outcome can facilitate code testing, to ensure that users do not see a degradation in program performance for incrementally built machine code binaries.

An example of an undesired interaction between incremental compilation and inlining that may affect this no-difference preference is described in the following example scenario: in a full build, a function "foo" may call a function "bar." An inliner module of the compiler may decide not to inline function "bar" into function "foo" because function "bar" may be too large of a code portion (e.g., above a code size threshold limit for inlining). So assuming there are no other dependences indicated in the generated dependence graph (as described above), the dependence graph will not include a dependence edge from "bar" to "foo". Now if an edit to the function "bar" makes the function "bar" much smaller in size, and hence an inline candidate (e.g., having a size below the code size threshold limit for inlining), the machine code generated for the modified source code by an incremental compile would still be functionally correct if we did not re-compile function "foo". However, the machine code for the function "foo" generated by the incremental compile (without the inline) would be different from the machine code generated by a full compile where the code of function "bar" would be inlined into the code of function "foo."

As such, to solve this, in an embodiment, a function having any callees that were re-compiled may be partly recompiled. The partial compile of such functions may be performed after the inlining phase of compilation. An IL representation of source code generated after inlining may be received, and a second checksum may be generated for a function having any callees that were recompiled. The second checksum may be compared with the stored value of the post-inline checksum (generated from the IL representation prior to the modifications). If there is no difference in the checksums, the function may be treated as though it is unaffected. If there is a difference in the checksums, then we continue compiling the function. This enables the no-difference preference to be complied with at a small cost (that of partially compiling some functions).

IV. Example Mobile and Stationary Device Embodiments

Computing device(s) 118, software development system 100, compiler 1400, build system 2200, GUI 300, and any of the flowcharts of FIGS. 2, 9-13, 15-16, 19, and 21 may be implemented as hardware logic/electrical circuitry.

For instance, in an embodiment, one or more, in any combination, of software development system 100, compiler 1400, build system 2200, GUI 300, and any of the flowcharts of FIGS. 2, 9-13, 15-16, 19, and 21 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

FIG. 23 shows a block diagram of an exemplary mobile device 2300 including a variety of optional hardware and software components, shown generally as components 2302. For instance, components 2302 of mobile device 2300 are examples of components that may be included in computing device(s) 118 (FIG. 1) in mobile device embodiments. Any number and combination of the features/elements of components 2302 may be included in a mobile device embodiment, as well as additional and/or alternative features/elements, as would be known to persons skilled in the relevant art(s). It is noted that any of components 2302 can communicate with any other of components 2302, although not all connections are shown, for ease of illustration. Mobile device 2300 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 2304, such as a cellular or satellite network, or with a local area or wide area network.

The illustrated mobile device 2300 can include a controller or processor referred to as processor circuit 2310 for performing such tasks as signal coding, image processing, data processing, input/output processing, power control, and/or other functions. Processor circuit 2310 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2310 may execute program code stored in a computer readable medium, such as program code of one or more applications 2314, operating system 2312, any program code stored in memory 2320, etc. Operating system 2312 can control the allocation and usage of the components 2302 and support for one or more application programs 2314 (a.k.a. applications, "apps", etc.). Application programs 2314 can include common mobile computing applications (e.g., email applications, calendars, contact managers, web browsers, messaging applications) and any other computing applications (e.g., word processing applications, mapping applications, media player applications).

As illustrated, mobile device 2300 can include memory 2320. Memory 2320 can include non-removable memory 2322 and/or removable memory 2324. The non-removable memory 2322 can include RAM, ROM, flash memory, a hard disk, or other well-known memory storage technologies. The removable memory 2324 can include flash memory or a Subscriber Identity Module (SIM) card, which is well known in GSM communication systems, or other well-known memory storage technologies, such as "smart cards." The memory 2320 can be used for storing data and/or code for running the operating system 2312 and the applications 2314. Example data can include web pages, text, images, sound files, video data, or other data sets to be sent to and/or received from one or more network servers or other devices via one or more wired or wireless networks. Memory 2320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 2320. These programs include operating system 2312, one or more application programs 2314, and other program modules and program data. Examples of such application programs or program modules may include, for example, computer program logic (e.g., computer program code or instructions) for implementing software development system 100, compiler 1400, build system 2200, GUI 300, and any of the flowcharts of FIGS. 2, 9-13, 15-16, 19, and 21, and/or further embodiments described herein.

Mobile device 2300 can support one or more input devices 2330, such as a touch screen 2332, microphone 2334, camera 2336, physical keyboard 2338 and/or trackball 2340 and one or more output devices 2350, such as a speaker 2352 and a display 2354.

Other possible output devices (not shown) can include piezoelectric or other haptic output devices. Some devices can serve more than one input/output function. For example, touch screen 2332 and display 2354 can be combined in a single input/output device. The input devices 2330 can include a Natural User Interface (NUI).

Wireless modem(s) 2360 can be coupled to antenna(s) (not shown) and can support two-way communications between processor circuit 2310 and external devices, as is well understood in the art. The modem(s) 2360 are shown generically and can include a cellular modem 2366 for communicating with the mobile communication network 2304 and/or other radio-based modems (e.g., Bluetooth 2364 and/or Wi-Fi 2362). Cellular modem 2366 may be configured to enable phone calls (and optionally transmit data) according to any suitable communication standard or technology, such as GSM, 3G, 4G, 5G, etc. At least one of the wireless modem(s) 2360 is typically configured for communication with one or more cellular networks, such as a GSM network for data and voice communications within a single cellular network, between cellular networks, or between the mobile device and a public switched telephone network (PSTN).

Mobile device 2300 can further include at least one input/output port 2380, a power supply 2382, a satellite navigation system receiver 2384, such as a Global Positioning System (GPS) receiver, an accelerometer 2386, and/or a physical connector 2390, which can be a USB port, IEEE 2394 (FireWire) port, and/or RS-232 port. The illustrated components 2302 are not required or all-inclusive, as any components can be not present and other components can be additionally present as would be recognized by one skilled in the art.

Furthermore, FIG. 24 depicts an exemplary implementation of a computing device 2400 in which embodiments may be implemented. For example, computing device(s) 118 (FIG. 1) may be implemented in one or more computing devices similar to computing device 2400 in stationary computer embodiments, including one or more features of computing device 2400 and/or alternative features. The description of computing device 2400 provided herein is provided for purposes of illustration, and is not intended to be limiting. Embodiments may be implemented in further types of computer systems, as would be known to persons skilled in the relevant art(s).

As shown in FIG. 24, computing device 2400 includes one or more processors, referred to as processor circuit 2402, a system memory 2404, and a bus 2406 that couples various system components including system memory 2404 to processor circuit 2402. Processor circuit 2402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2402 may execute program code stored in a computer readable medium, such as program code of operating system 2430, application programs 2432, other programs 2434, etc. Bus 2406 represents one or more of any of several types of bus structures, including a memory bus or memory controller, a peripheral bus, an accelerated graphics port, and a processor or local bus using any of a variety of bus architectures. System memory 2404 includes read only memory (ROM) 2408 and random access memory (RAM) 2410. A basic input/output system 2412 (BIOS) is stored in ROM 2408.

Computing device 2400 also has one or more of the following drives: a hard disk drive 2414 for reading from and writing to a hard disk, a magnetic disk drive 2416 for reading from or writing to a removable magnetic disk 2418, and an optical disk drive 2420 for reading from or writing to a removable optical disk 2422 such as a CD ROM, DVD ROM, or other optical media. Hard disk drive 2414, magnetic disk drive 2416, and optical disk drive 2420 are connected to bus 2406 by a hard disk drive interface 2424, a magnetic disk drive interface 2426, and an optical drive interface 2428, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 2430, one or more application programs 2432, other programs 2434, and program data 2436. Application programs 2432 or other programs 2434 may include, for example, computer program logic (e.g., computer program code or instructions) for implementing software development system 100, compiler 1400, build system 2200, GUI 300, and any of the flowcharts of FIGS. 2, 9-13, 15-16, 19, and 21, and/or further embodiments described herein.

A user may enter commands and information into the computing device 2400 through input devices such as keyboard 2438 and pointing device 2440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 2402 through a serial port interface 2442 that is coupled to bus 2406, but may be connected by other interfaces, such as a parallel port, game port, or a universal serial bus (USB).

A display screen 2444 is also connected to bus 2406 via an interface, such as a video adapter 2446. Display screen 2444 may be external to, or incorporated in computing device 2400. Display screen 2444 may display information, as well as being a user interface for receiving user commands and/or other information (e.g., by touch, finger gestures, virtual keyboard, etc.). In addition to display screen 2444, computing device 2400 may include other peripheral output devices (not shown) such as speakers and printers.

Computing device 2400 is connected to a network 2448 (e.g., the Internet) through an adaptor or network interface 2450, a modem 2452, or other means for establishing communications over the network. Modem 2452, which may be internal or external, may be connected to bus 2406 via serial port interface 2442, as shown in FIG. 24, or may be connected to bus 2406 using another interface type, including a parallel interface.

As used herein, the terms "computer program medium," "computer-readable medium," and "computer-readable storage medium" are used to generally refer to physical hardware media such as the hard disk associated with hard disk drive 2414, removable magnetic disk 2418, removable optical disk 2422, other physical hardware media such as RAMs, ROMs, flash memory cards, digital video disks, zip disks, MEMs, nanotechnology-based storage devices, and further types of physical/tangible hardware storage media (including memory 2404 of FIG. 24). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 2432 and other programs 2434) may be stored on the hard disk, magnetic disk, optical disk, ROM, RAM, or other hardware storage medium. Such computer programs may also be received via network interface 2450, serial port interface 2452, or any other interface type. Such computer programs, when executed or loaded by an application, enable computing device 2400 to implement features of embodiments discussed herein. Accordingly, such computer programs represent controllers of the computing device 1800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Example Embodiments

A method performed by a software development system during a debugging session in which source code is being debugged is described herein. The method includes: providing an interactive control within a user interface of the software development system that a user can activate to unoptimize a function included in the source code; and in response to at least determining that the user has activated the interactive control: automatically marking the function to generate an updated version of the source code; performing an edit and continue operation to build a compiled representation of the updated version of the source code in which at least one optimization is disabled for the function and in which optimizations are enabled for other functions of the updated version of the source code; and utilizing the compiled representation of the updated version of the source code to continue the debugging session.

In one embodiment of the foregoing method, the user interface of the software development system comprises a GUI and the method further comprises: determining that the user interacted with a representation of a function in the GUI of the code development system. In further accordance with an embodiment, the providing the interactive control within the GUI is performed in response to at least determining that the user interacted with the representation of the function.

In further accordance with such a method, the representation of the function may comprise one or more lines of a function body and wherein determining that the user interacted with the representation of the function comprises: determining that the user hovered over or clicked on at least one of the lines.

In another embodiment of the foregoing method, providing the interactive control within the user interface comprises: presenting a menu item within a GUI of the software development system that can be selected by the user to unoptimize the function.

In yet another embodiment of the foregoing method, automatically marking the function comprises: automatically adding at least a first line of code before the function and at least a second line of code after the function.

In further accordance with this embodiment, the user interface of the software development system may comprise a GUI and the method may further comprise: displaying the first line of code and the second line of code within the GUI.

In a still further embodiment of the foregoing method, the user interface of the software development system may comprise a GUI and the method may further comprise: presenting within the GUI a list of functions that have been unoptimized during the debugging session.

In further accordance with this embodiment, presenting within the GUI the list of functions that have been unoptimized during the debugging session may comprise presenting within the GUI a tree view that shows different functions that have been unoptimized across different files during the debugging session.

In a yet further embodiment of the foregoing method, the method may further comprise: determining that the user is ending the debugging session; and in response to determining that the user is ending the debugging session, removing at least the marking from the function.

A system is also described herein that includes: at least one processor circuit; and at least one memory that stores program code configured to be executed by the at least one processor circuit. The program code comprises: a software development application configured to allow a user thereof to debug source code during a debugging session, the software development application being further configured to provide an interactive control within a user interface that the user can activate to re-optimize a function included in the source code that was previously unoptimized and, in response to at least determining that the user has activated the interactive control, to: automatically remove a marking from the function to generate an updated version of the source code; perform an edit and continue operation to build a compiled representation of the updated version of the source code in which at least one optimization is re-enabled for the function and in which optimizations remain enabled for other functions within the updated version of the source code; and utilizing the compiled representation of the updated version of the source code to continue the debugging session.

In one embodiment of the foregoing system, the software development application is further configured to: determine that the user interacted with the representation of the function in a graphical user interface (GUI); and provide the interactive control within the GUI in response to at least determining that the user interacted with the representation of the function.

In another embodiment of the foregoing system, the representation of the function comprises one or more lines of a function body and the software development application is configured to determine that the user has interacted with the representation of the function by: determining that the user has hovered over or clicked on at least one of the lines.

In yet another embodiment of the foregoing system, the software development application is configured to provide the interactive control within the user interface by: presenting a menu item within a graphical user interface (GUI) that can be selected by the user to re-optimize the function.

In still another embodiment of the foregoing system, the software development application is configured to automatically remove the marking from the function by: automatically removing at least a first line of code from before the function and at least a second line of code from after the function.

In a further embodiment of the foregoing system, the software development application is further configured to present within a GUI a list of functions that have been unoptimized during the debugging session.

The a still further embodiment of the foregoing system, the software development application is configured to present within the GUI the list of functions that have been unoptimized during the debugging session by: presenting within the GUI a tree view that shows different functions that have been unoptimized across different files during the debugging session.

A computer program product is also described herein. The computer program product comprises a computer-readable memory having computer program logic recorded thereon that when executed by at least one processor causes the at least one processor to perform a method. The method comprises: providing within a user interface of a software development system an interactive control that a user can activate to prevent optimization of a function within source code; in response to at least determining that the user has activated the interactive control, automatically marking the function to generate an updated version of the source code; and building a compiled representation of the updated version of the source code in which at least one optimization is disabled for the function and in which optimizations are enabled for other functions of the updated version of the source code.

In one embodiment of the foregoing computer program product, the user interface of the software development system comprises a GUI and the method further comprises: determining that a user has interacted with a representation of the function in the GUI of the software development system. In further accordance with such an embodiment, the interactive control is provided within the GUI in response to at least determining that the user had interacted with the representation of the function.

In another embodiment of the foregoing computer program product, the representation of the function comprises one or more lines of a function body and determining that the user has interacted with the representation of the function comprises: determining that the user has hovered over or clicked on at least one of the lines.

In yet another embodiment of the foregoing computer program product, automatically marking the function comprises: automatically adding at least a first line of code before the function and at least a second line of code after the function.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by a software development system during a debugging session in which source code is being debugged, comprising:

for each of a plurality of functions included in the source code:
determining that a user interacted with a representation of the function in a graphical user interface (GUI) of the software development system;
in response to at least determining that the user interacted with the representation of the function, providing a first interactive control as a selectable option within the GUI of the software development system that the user can activate to unoptimize the function; and
in response to at least determining that the user has activated the first interactive control:
automatically marking the function via an insertion of source code to generate an updated version of the source code;

performing an edit and continue operation to build a compiled representation of the updated version of the source code in which at least one optimization is disabled for the function and in which at least one optimization is enabled for at least one other function of the updated version of the source code; and utilizing the compiled representation of the updated version of the source code to continue the debugging session;

presenting, within a first portion of the GUI that is different from a second portion of the GUI that displays the source code, a list of functions that have been unoptimized during the debugging session, the first portion of the GUI and the second portion of the GUI being displayed simultaneously;

providing a second interactive control within the GUI that the user can activate to re-optimize all of the plurality of functions; and in response to at least determining that the user has activated the second interactive control, automatically removing each insertion of source code for all of the functions.

2. The method of claim 1, wherein the representation of the function comprises one or more lines of a function body and wherein determining that the user interacted with the representation of the function comprises:

determining that the user hovered over or clicked on at least one of the lines.

3. The method of claim 1, wherein providing the first interactive control within the GUI comprises:

presenting a menu item within the GUI of the software development system that can be selected by the user to unoptimize the function.

4. The method of claim 1, wherein automatically marking the function comprises:

automatically adding at least a first line of code before the function and at least a second line of code after the function.

5. The method of claim 4, further comprising:

displaying the first line of code and the second line of code within the GUI.

6. The method of claim 1, wherein presenting, within the first portion of the GUI, the list of functions that have been unoptimized during the debugging session comprises:

presenting within the first portion of the GUI a tree view that shows different functions that have been unoptimized across different files during the debugging session.

7. The method of claim 1, further comprising:

determining that the user is ending the debugging session; and in response to determining that the user is ending the debugging session, removing at least the marking from the function.

8. The method of claim 1, wherein:

the providing the first interactive control within the GUI is performed in response to at least a determination that the function is optimized.

9. The method of claim 1, further comprising:

adding an additional function to the list of functions in response to a user interaction to unoptimize the additional function.

10. A system, comprising:

at least one processor circuit; and at least one memory that stores program code configured to be executed by the at least one processor circuit, the program code comprising:

a software development application configured to allow a user thereof to debug source code during a debugging session, the software development application being further configured to:

present, within a first portion of a graphical user interface (GUI) that is different than a second portion of the GUI that displays the source code, a list of functions that were previously unoptimized during the debugging session, the first portion of the GUI and the second portion of the GUI being displayed simultaneously;

provide an interactive control as a selectable option within the GUI of the software development system that the user can activate to re-optimize a plurality of automatically marked functions included in the source code that were previously unoptimized;

determine that the user has activated the interactive control within the GUI; and in response to at least determining that the user has activated the interactive control:

for each of a plurality of automatically marked functions, automatically remove a marking from the function via a removal of source code;

perform an edit and continue operation to build a compiled representation of an updated version of the source code in which at least one optimization for each of the plurality of automatically marked functions is re-enabled for the function and in which optimizations remain enabled for other functions within the updated version of the source code; and utilizing the compiled representation of the updated version of the source code to continue the debugging session.

11. The system of claim 10, wherein the software development application is further configured to:

determine that the user has interacted with a representation of a function in the GUI by hovering over or clicking on at least line of a function body; and in response to at least determining that the user interacted with the representation of the function, provide a second interactive control as a selectable option within the GUI that the user can active to unoptimize the function.

12. The system of claim 10, wherein the software development application is configured to:

present a menu item within the GUI that can be selected by the user to re-optimize a previously unoptimized function.

13. The system of claim 10, wherein the software development application is configured to automatically remove the marking from each of the plurality of automatically marked functions by:

automatically removing at least a first line of code from before the function and at least a second line of code from after the function.

14. The system of claim 10, wherein the software development application is configured to present, within the first portion of the GUI, the list of functions that have been unoptimized during the debugging session by:

presenting within the first portion of the GUI a tree view that shows different functions that have been unoptimized across different files during the debugging session.

15. The system of claim 10, wherein the software development application is further configured to:
provide a second interactive control within the GUI that the user can activate to unoptimize a function in response to at least a determination that the function is optimized.

16. The system of claim 10, wherein the software development application is further configured to:
add an additional function to the list of functions in response to a user interaction to unoptimize the additional function.

17. A computer program product comprising a computer-readable memory having computer program logic recorded thereon that when executed by at least one processor causes the at least one processor to perform a method, the method comprising:
for each of a plurality of functions included in source code being debugged during a debugging session in a software development system:
determining that a user interacted with a representation of the function in a graphical user interface (GUI) of the software development system;
in response to at least determining that the user interacted with the representation of the function, providing within the GUI of the software development system a first interactive control as a selectable option that the user can activate to prevent optimization of the function;
in response to at least determining that the user has activated the first interactive control, automatically marking the function via an insertion of source code to generate an updated version of the source code; and building a compiled representation of the updated version of the source code in which at least one optimization is disabled for the function and in which at least one optimization is enabled for at least one other function of the updated version of the source code;
presenting, within a first portion of the GUI that is different from a second portion of the GUI that displays the source code, a list of functions that have been unoptimized during the debugging session, the first portion of the GUI and the second portion of the GUI being displayed simultaneously;
providing a second interactive control within the GUI that the user can activate to re-optimize all of the plurality of functions; and
in response to at least determining that the user has activated the second interactive control, automatically removing each insertion of source code for all of the functions.

18. The computer program product of claim 17, wherein the representation of the function comprises one or more lines of a function body and wherein determining that the user has interacted with the representation of the function comprises:
determining that the user has hovered over or clicked on at least one of the lines.

19. The computer program product of claim 17, wherein automatically marking the function comprises:
automatically adding at least a first line of code before the function and at least a second line of code after the function.

20. The computer program product of claim 17, wherein:
the providing the first interactive control within the GUI is performed in response to at least a determination that the function is optimized.

* * * * *